(12) United States Patent
Tripathi et al.

(10) Patent No.: US 10,506,434 B2
(45) Date of Patent: *Dec. 10, 2019

(54) SYSTEM FOR ACCELERATED NETWORK ROUTE UPDATE THROUGH EXCLUSIVE ACCESS TO ROUTING TABLES

(71) Applicant: AVAGO TECHNOLOGIES INTERNATIONAL SALES PTE. LIMITED

(72) Inventors: Devendra Kumar Tripathi, Union City, CA (US); Mohan Venkatachar Kalkunte, Saratoga, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,521

(22) Filed: Apr. 25, 2018

(65) Prior Publication Data

US 2018/0249335 A1   Aug. 30, 2018

Related U.S. Application Data

(63) Continuation of application No. 14/700,709, filed on Apr. 30, 2015, now Pat. No. 9,986,434.

(Continued)

(51) Int. Cl.
| | |
|---|---|
| *H04L 12/801* | (2013.01) |
| *H04W 12/06* | (2009.01) |
| *H04W 72/00* | (2009.01) |
| *H04W 28/02* | (2009.01) |
| *H04L 12/701* | (2013.01) |

(Continued)

(52) U.S. Cl.
CPC .......... *H04W 12/06* (2013.01); *H04L 12/403* (2013.01); *H04L 45/00* (2013.01); *H04L 45/02* (2013.01); *H04L 45/028* (2013.01); *H04L 45/64* (2013.01); *H04L 47/10* (2013.01); *H04W 28/02* (2013.01); *H04W 72/00* (2013.01); *H04L 12/40065* (2013.01); *H04L 29/08819* (2013.01); *H04L 41/08* (2013.01); *H04L 45/021* (2013.01); *H04L 45/60* (2013.01); *H04L 61/255* (2013.01); *H04L 63/08* (2013.01); *H04L 67/2852* (2013.01)

(58) Field of Classification Search
CPC ...... H04W 28/02; H04W 72/00; H04L 45/02; H04L 45/60; H04L 61/255; H04L 47/10; H04L 12/40065; H04L 45/021; H04L 45/00
See application file for complete search history.

(56) References Cited

U.S. PATENT DOCUMENTS 9,986,434 B2 * 5/2018 Tripathi ................ H04W 12/06
2012/0300780 A1 * 11/2012 Hasan ................ H04L 41/5009
370/392

(Continued)

*Primary Examiner* — Salvador E Rivas
(74) *Attorney, Agent, or Firm* — Xsensus LLP

(57) ABSTRACT

A route update system (RUS) may support increased efficiency and speed for performing a routing table update. The RUS may include a control plane processor device, which may implement update snoop module circuitry. The RUS may also include a data routing switch, which may implement update inject module circuitry. The RUS may include one or more RUS connectivity systems that link the update snoop module circuitry and the update inject module circuitry.

20 Claims, 10 Drawing Sheets

Related U.S. Application Data

(60) Provisional application No. 61/986,804, filed on Apr. 30, 2014.

(51) Int. Cl.
    *H04L 12/403* (2006.01)
    *H04L 12/759* (2013.01)
    *H04L 12/715* (2013.01)
    *H04L 12/751* (2013.01)
    H04L 29/12 (2006.01)
    H04L 29/08 (2006.01)
    H04L 12/755 (2013.01)
    H04L 12/40 (2006.01)
    H04L 12/24 (2006.01)
    H04L 29/06 (2006.01)
    H04L 12/773 (2013.01)

(56) References Cited

U.S. PATENT DOCUMENTS

| | | |
|---|---|---|
| 2014/0040321 A1 | 2/2014 | Cohen |
| 2014/0044135 A1* | 2/2014 | Sankaralingam ....... H04L 45/60 370/401 |
| 2014/0086240 A1 | 3/2014 | Assarpour |
| 2014/0245262 A1 | 8/2014 | Hill |
| 2014/0281508 A1* | 9/2014 | Akhter ................ H04L 9/0833 713/162 |
| 2014/0282968 A1* | 9/2014 | Aboughanaima ....... H04L 63/08 726/7 |
| 2015/0121476 A1* | 4/2015 | Zheng .................... H04L 45/02 726/4 |

\* cited by examiner

SYSTEM FOR ACCELERATED NETWORK ROUTE UPDATE THROUGH EXCLUSIVE ACCESS TO ROUTING TABLES

PRIORITY CLAIM

This application is a continuation of U.S. patent application Ser. No. 14/700,709, filed Apr. 30, 2015, which claims the benefit of priority to U.S. provisional patent application Ser. No. 61/986,804, filed Apr. 30, 2014. The entire contents of both of which are incorporated herein by reference.

TECHNICAL FIELD

This disclosure relates to networking. This disclosure also relates to a system for accelerated network route updating.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling, including improvements in path resolution, will further enhance performance of data networks.

DETAILED DESCRIPTION

Figure 1:
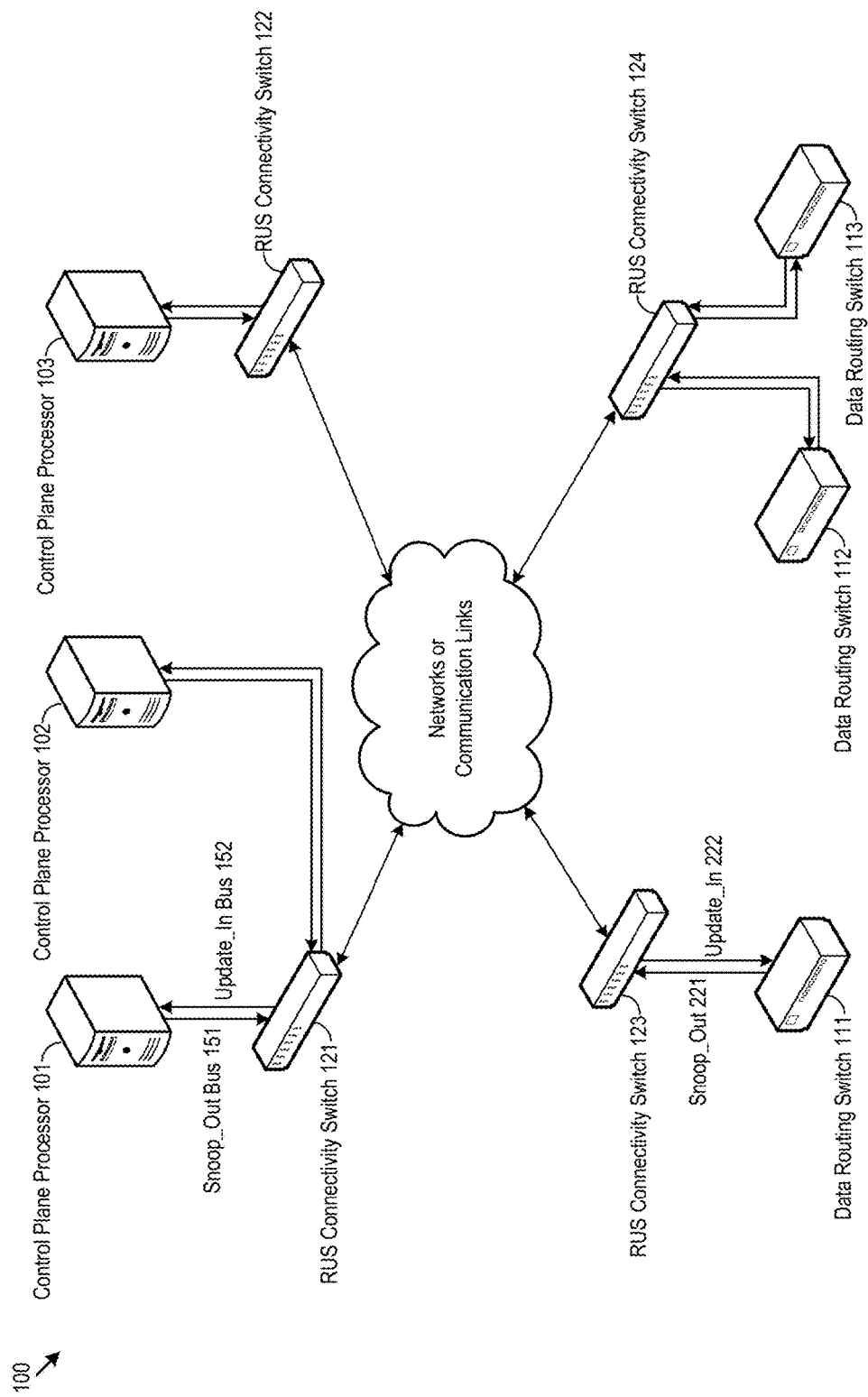
FIG. 1 illustrates an example of a route update system.

Network packet/data routing (also referred to as packet routing or data routing) can require use of routing tables that are maintained and updated as routing among networked devices changes. Prior to the implementation of network function virtualization (NFV), updates to established routes were relatively infrequent. With the implementation of NFV, allocation and de-allocation of data compute services offered by numerous processor cores possibly distributed throughout one or more networks has become more prevalent. These changes in routing should be operations that occur efficiently and simply to optimize utilization of compute resources and thus increase economic value/potential. The virtualization of network functions may employ methods such as: (a) Standardization of packet/data route update application program interfaces (APIs), which may be referred to as RUAs, and (b) Fast execution of these update APIs to shift or otherwise change the network routing possibly as much as multiple times a millisecond. NFV can make available standardized RUAs that can be used by compute and storage service management software to establish and/or tear down packet/data routes between data generation/storage and data compute elements at frequencies not previously contemplated.

The route update system allows such RUAs to manage compute services in smaller and smaller granularities such that dynamic changes in routing can complement and enable efficient use of compute resources allocated to NFV function. Thus, since the route update system enables frequent and reliable dynamic changes to network data routing, changes in allocations of NFV resources is unconstrained by associated dynamic changes in network data routing. In some examples, the routing table update rates that at present, range in few thousand to few tens of thousands per second can be transformed by the routing update system to few hundreds of thousands to few millions per second. Thus, the routing update system can enable/accelerate the adoption of Software Defined Networking (SDN) and Network Function Virtualization (NFV). The route update system enables atomic update of multiple live-routing entries associated with a routing entry, which can also be referred to as all or none routing entry updates. Thus, the system can create a new routing entry and update all memory locations related to this new routing entry in a single continuous linear action without interruption by other processes or activities. The single continuous linear action also includes updates to routing entry information shared with other live routing entries. The atomic update enables better utilization of routing table memory since no additional memory space allocation is needed for partially updated routes due to portions of a route update request being separately executed to allow for intervening other functions to be executed. The routing table update rates that in previous systems, ranged from a few thousand updates per second to a few tens of thousands of updates per second can be transformed using the route update system to hundreds of thousands of updates per second to millions of updates per second. Thus, use of the routing update system should enable/accelerate the adoption of Software Defined Networking (SDN) and Network Function Virtualization (NFV)

A routing table update may occur through a process referred to as a control plane update. Control plane updates create a new routing entry when all memory locations related to a new routing entry have been updated. Once all memory locations are updated, the root location of the routing entry is changed, which then diverts the search process to go through new entry related memory locations. If certain portions of routing entry information is shared with other live routing entries, this information must be created/copied to all memory locations related to those routing entries as well (and then change the root memory locations for each of those routing entries one by one). Thus, control plane updates face multiple performance challenges that introduce significant delay in completion of routing table updates. For example, first, control plane updates execute on control plane central processing unit (CPU), and thus are subject to an operating system's allocation of CPU resources. Secondly, the updates may invoke a driver that can take multiples of micro seconds (pS) of time to execute, such as Peripheral Component Interconnect express (PCIe) drivers, as one example. Thirdly, control plane updates may face arbitration with data plane traffic in different ways and the control plane traffic may be de-prioritized by the arbitration thereby introducing additional undesirable delay. The situation becomes even more acute when a control plane CPU is located in a different device (such as in a centralized software defined network (SDN) controller) and connects to a local control plane CPU through switches or other network devices. Given all these undesirable delays points, control plane performance (which may be measured as updates/sec) may be many orders of magnitude lesser than data plane performance. Software Defined Networks and Network Function Virtualization may implement dynamic route updates, thus increasing the control plane update performance requirement.

The route update system as described by the methods, systems, devices, circuitry and logic disclosed herein may bypass some or all of the control plane update bottlenecks noted above, and may result in increased speed and efficiency in performing routing table updates. In some implementations, the route update system picks up and/or pushes out the update instruction from a control plane close point. A control plane close point refers to a position within the source, such as on a chip, or in close vicinity of the source. The system can transfer the update instruction through an update communication path that can involve traditional bridging, switching and routing to a device close to a table storage location, such as in a memory table within a switch. A device close to table storage location refers to a location within a destination, such as a routing chip or in close vicinity of the routing chip. Accordingly, portions of the route update system can be on chip, on package, such as part of a multi-chip configuration, on circuit board, or in area, such as in a datacenter. A standards based Route Update System (RUS) connects the control plane CPU chip/box to a switching chip/box, whether both are local to a chip (e.g., on a System on a Chip (SOC)); local to a physical package (e.g., a Multi-Chip Module (MCM)); local to a board (e.g., on a common board with a control plane processor), or local to a network. Accordingly, a Route Update System (RUS) is implementable in an SoC, MCM, printed circuit board (PCB), in a network, in other alternative or additional implementations, and in any combination thereof. As one effect, the RUS may transform control plane communication into data plane communication.

Table 1 below shows example terminology and operational parameters of the RUS system, which may or may not be stored in registers and which are discussed further below.

TABLE 1

| Term | Example |
| --- | --- |
| (Routing) Address Space Unit | A set of addresses of entries of one or more routing tables that share common Address Space Attributes (see below) and may be grouped into or identified as single Address Space Unit (ASU).<br>This term can also be referred to as Update Address Space. |
| Address Space Attribute | Address Space Attributes qualify the basic update information (that is memory location and memory data) and may include the following exemplary attributes:<br>AddressSpaceOwner: may refer to an identifier of a Control Plane Processor that owns the responsibility of route table maintenance (such as updates).<br>RoutingTableFormat: may refer to the format of the routing table. Routing table format may be standardized across a route update network. Optionally, the routing table format may differentiate one Address Space Unit from one or more others.<br>RoutingTableDomain: may refer to the shared administrative domain or purpose of data routing. A data center is one example of such a domain. Address Space Units can be defined in a given RoutingTableDomain. Thus, in example implementations, one or more RoutingTable Domains may be present, however, for purposes of this disclosure, the discussion will mainly focus on example implementations in a single RoutingTableDomain. |
| (Routing) Address Space | The sum of Address Space Units that share a common RoutingTableDomain may be referred to as Routing Address Space (RAS), or as Address Space. The Control Plane Processor(s) (CPP) may allocate addresses for the RAS, e.g., irrespective of whether the CPP owns the complete address space or not. |
| Logical Address Space | Logical Address Space may identify Routing Address Space Units that differ only in format (RoutingTableFormat) as being part of the same Logical Address Space. As an optional feature, an Update Injection Module (described below), can provide a format conversion feature and thus obviate the need for a Control Plane Processor (CPP) to maintain copies of routing tables that represent the same routes, but differ only in format. (Note that size of the Routing Address Space (RAS) does not depend on the presence or absence of this feature and as a corollary, a Control Plane Processor may include unused address spaces or a part of an address space that it may never use). |

TABLE 1-continued

| Term | Example |
| --- | --- |
| Data Route Switch (DRS) | This term may refer to a device, circuitry, and/or logic circuitry that performs routing table management by using routing tables to decide the routing of incoming data packets. The data packet could be moving from switch to switch, host to switch, processor core to processor core, or processor core to storage, as some examples.<br>Note that Data Route Switch could be a processor, such as a data plane processor.<br>A DRS may also be referred to as a "switch" or routing table management circuitry. |
| Control Plane Processor (CPP) | CPP may refer to a device, circuitry, and/or logic circuitry that manages routes. The route management performed by the CPP could be networking-protocol based or it could be based on direct requests made by or on behalf of software clients, users, etc.<br>Note that control plane processor could be a processor in a specialized server computer.<br>A CPP may also be referred to as a routing management circuitry. |
| Route Update System (RUS) | The RUS may refer to components, devices, and/or circuitry, that may use logic or software, and any other connectivity elements that snoop, communicate, and/or update the routes. The underlying transport for the RUS may depend on its scope or implementation. On a System-on-chip (SOC), the transport for the RUS may take the form of a First-in-first-out (FIFO) or other queue. On a multiple-chip-module (MCM) or board, the transport for the RUS may include a proprietary serial bus, a Peripheral Component Interconnect express (PCI-e) bus, Infiniband fabric, or any other connectivity circuitry within the MCM.<br>For a multi-device network or communication system (e.g., Inter-box or inter-building), the transport for the RUS may include any number of communication networks and links, such as Ethernet. When connectivity provided by the RUS is provided according to communication standard protocols, the RUS may include corresponding connectivity switches as well.<br>The term RUS may also be used to denote connectivity in communicating routing table updates. |
| Update Snoop Module (USM) Circuitry | This may refer to a circuitry and software and/or logic, or a device that may be passively connected to the bus which carries update information to the Address Space Unit (s) within a CPP, within the DRS (for example, if the CPP is local to the DRS), or both. The USM may snoop or monitor for updates and if the address of the update falls within the configured address space(s) of the USM, the USM circuitry may capture the update information and transform or translate the update information into an update instruction to be sent over the RUS. There can be many manifestations or implementations of the USM. Some example implementations may have the USM circuitry throttle the core if a buffer in the USM circuitry is about to overflow with update instructions that the USM circuitry is not able to process quickly enough. |
| Update Inject Module (UIM) Circuitry | This may refer to circuitry and/or logic, or a device that may be actively connected to a bus which carries the route update information to the address space unit (for example included within DRS). In one possible implementation, the UIM circuitry may arbitrate an incoming request from a main (Search) path with the request coming from an update path for a given address space. In this example, the UIM circuitry can include a final bus that controls transfer of routing table updates to a table memory where the routing table is stored. A device may implement the UIM at an "insertion point" (for example at a communication path or within the device) such that arbitration performed by the UIM is permitted in the datapath at the insertion point. The RUS may attempt to be accommodating to a main path routing search request so that the update does not impact search performance of the device, such as a switch. There can be many manifestations or implementations of the UIM circuitry that perform |

TABLE 1-continued

| Term | Example |
| --- | --- |
| | the arbitration of routing update requests for the routing table memory. |
| RUS Connectivity System (RCS) | This may refer to a network of busses, wires, components, devices, and/or systems used to transport the update instructions from a USM circuitry to a UIM circuitry. |
| Update Grouping Size (UGS) | This parameter may be a threshold specifying the number of update instructions that the USM circuitry accumulates in a buffer before sending the update information onto the RCS. The local buffering of the USM circuitry may store a greater number of update instructions than the UGS number. Accumulation of routing updates in the local buffering may increase efficiency in transporting of the update instructions and enable update atomicity in the RUS.<br>One possible value of this threshold parameter is 64 update instructions. |
| End Devices | The CPP and DRS may also be referred to as End Devices since they are endpoints of a routing table update process (e.g., the CPP being at the routing update initiator end and the DRS being at the update execution end). |
| Table Master | Also referred to as "master". This may refer to a device or circuitry with capability to control the update function of a routing table, for example, a CPP can be a master. |
| Table Holder | This may refer to the device or circuitry that maintains the routing table that is subject to update, such as a target DRS with access to a memory in which the routing table is stored. |
| IDLE | The Routing Table can be used for search and update. In some cases, the routing table can also be used for maintenance purposes. A clock cycle or other time period when the routing table is not used for any purposes other than RUS routing updates may be referred to as an IDLE clock or time period. A RUS routing update can be scheduled when there is an IDLE. |
| UpdateWait | This parameter may be independently maintained and used with both the USM circuitry and the UIM circuitry, respectively.<br>After a first update instruction has been snooped(identified) and captured, the USM circuitry may start a counter. The counter may be referred to as an UpdateWait counter for the USM which counts a number of USM clocks<br>After the UIM receives a first update instruction(s), it starts a counter. This counter may be referred to as the UpdateWait counter for the UIM, which counts a number of UIM clocks. |
| MaxUpdateWait | This parameter may be independently maintained and used with both the USM circuitry and the UIM circuitry, respectively.<br>For the USM, the MaxUpdateWait parameter may refer to a predetermined threshold maximum value of the UpdateWait counter before the accumulated update instructions are sent out over the RCS. In some examples, the accumulated update instructions may be sent over the RCS irrespective of UGS requirement being met or not.<br>For the UIM, the MaxUpdateWait may refer to a predetermined threshold maximum value of the UpdateWait counter before the UIM enforces flow control and, for example, delays the initiation of a requested search or local update at the routing update execution end device in order to perform a RUS update to the Routing Table. Based on the design of the routing table management circuitry, such enforcement could be in different forms (including a possibility of doing nothing).<br>One possible value of this parameter is a predetermined threshold value of 256 update instructions. |
| RUS Clock | The RUS clock may drive the Route Update System which may include driving the CPP and the DRS. The RUS clock may be used for performance computation and also as guideline of expected performance of various RUS devices/systems. |

TABLE 1-continued

| Term | Example |
| --- | --- |
| RUS Clock Period (RCP) | The RUS Clock Period may be a predetermined threshold value that defines the clock(s) that drives the RUS. One possible threshold value is 4 nanoseconds (ns). The RCP may be used to derive performance computations and also as a guideline of expected performance of various RUS devices/systems. Related term is RUS Clock Frequency (or RUS Frequency) that is 1/RCP. |
| CPPFrequency | This may refer to the frequency of a CPP clock. Thus, for example, the CPPFrequency can be the frequency at which the CPP reads/write to memory. In example configurations where snooping is performed at a different frequency than that of the read/write memory interface, the CPPFrequency may indicate the snooping frequency. |
| DRSFrequency | This may refer to the frequency of a routing table management circuitry clock, such as a DRS clock. Thus, for example, the DRSFrequency can be the frequency at which the switch circuitry reads/write to table memory. In example configurations where the UIM transfers the routing update data to an intermediate bus (which then writes to memory), DRSFrequency may refer to the frequency of the transfer protocol. |
| Update Address Width (UAW) | UAW refers to number of bits in the routing update address embedded in a hardAPI packet. One possible routing update address width is a predetermined width of 48 bits or bytes. Specific implementations may have a lesser or greater UAW value. In an example, the maximum value of the UAW may be the Update Data Width (below). |
| Update Data Width (UDW) | UDW refers to a number of bits in the routing update data embedded in a hardAPI packet. One possible memory word width is a predetermined width of 64 bits or bytes, though other example implementations may have a greater or lesser UDW. |
| Update Header Width (UHW) | This may refer to the width of a routing update packet header of a hardAPI packet, which in one example can be 26 bytes. One component of the update header is an ID of the update source. |
| Time Data Width (TDW) | TDW defines the number of bits in value of time that can be stored in the CPP or the DRS. The value of time may be defined in units of a clock, such as a clock local to the device, and may be a number of clock cycles. One example possible TDW is 48 bits. This parameter may be used to define counters and statistics. |
| UpdateListDepth (ULD) | This may refer to the number of update addresses that are captured in storage at a routing table management circuitry, such as a table holder device. One example possible value is 256 update addresses. Note that there can be two or more lists that may be maintained, at least one at the CPP, and at least one at the DRS. |
| MaxUpdateAtomicity | This may refer to a predetermined threshold value which is a maximum number of updates that can be done without interrupting the routing updates by, for example, allowing an intervening search of the routing table maintained by the routing table management circuitry. In some implementations, the value of this parameter can be the same as the Update Grouping Size (UGS). |
| MaxSrchPushBack | This may refer to a predetermined number of clock cycles (that drives the read/write of routing table memory) that a search instruction can be delayed (blocked) while a route update is performed. This number may be the same or more than the MaxUpdateAtomicity parameter value. One possible example value of this parameter is 64 clock cycles. Note that if routing table management circuitry (such as a DRS) requires more than one clock cycle to update a routing table entry, this parameter may accordingly be higher than the MaxUpdateAtomicity value.<br>If the UIM does not control the delay of a search operation and atomicity is being enforced, this parameter may become a guideline for the device component that handles the memory update of the routing table. |

TABLE 1-continued

| Term | Example |
| --- | --- |
| CPPMaxUpdateCountLimit | In some implementations, this parameter refers to a maximum number of route updates that the CPP, may continuously make for a given address space, and may be applicable if a software based Update Speed Matching is implemented at the CPP. One possible example value is 256 separate route updates. In some examples, the value may be tied to an upper fill threshold of a USM update instruction buffer, such as, for example, an AlmostFull threshold. |
| CPPMinUpdateBreak | This parameter value may specify a waiting period, such as in clock periods of the USM clock, representing a period after a routing update initiator, such as a CPP, completes an update to an address space before the routing update initiator, may perform another update to the same address space. This parameter may be applicable if Update Speed Matching is implemented at the routing update initiator,. The value of this parameter may depend upon the CPU frequency, and the value may be tied to a lower fill threshold of a USM update instruction buffer, such as an AlmostEmpty threshold. |
| CPPUpdateWordSize | This parameter may refer to a predetermined size of a write data word that goes from a CPU core (or last cache) to the memory in which the routing table is stored. The parameter may be specified in units of RUS word size, such as a number of words of the UDW value. A higher volume transport, such as a wider bus, for example, may support increased update throughput. |
| DSRUpdateWordSize | This parameter may refer to a predetermined size of a write data word that goes from the UIM to the table memory containing the routing table. This parameter may be specified in units of the RUS word size, such as a number of words of the UDW value. A higher volume transport, such as a wider bus, for example, may support increased update throughput. |
| SoftAPI Packet | A network packet that has a payload defined at Open System Interconnect Layer four or above (using the OSI reference model as reference) |
| HardAPI Packet | A network packet that has a payload limited to Open System Interconnect Layer three or below (using the OSI reference model as reference) |
| SoftAPI | An Application Programming Interface that uses SoftAPI Packets to communicate between two entities, such as a NFV/SDN Controller and a Forwarding Engine |
| HardAPI | An Application Programming Interface that uses HardAPI Packets to communicate between two entities, such as a NFV/SDN Controller and a Forwarding Engine |

Regarding conventions for defining a register value, in the examples provided herein, a Verilog like syntax can be used. For example, as used herein, a syntax of {WIDTH{1'b0}} may refer to a set of "WIDTH" related bits, having a value of 0. In another example, "1'b0" implies a one bit wide binary number having value of 0 and "1'b1" implies a one bit wide binary number having value of 1. As another example, "4'h7" implies a 4 bit wide number in hexadecimal notation having a value of 7.

Many of the example parameter values described herein have been included based on experience and experimental results for switches and network processors. In other examples, any number of alternative parameter values may be used.

FIG. 1 shows an example of a route update system (RUS) 100. The RUS 100 may include one or more control plane processors (CPPs), such as those labeled as 101, 102, and 103 in FIG. 1, as well as one or more data routing switches (DRSs), such as those labeled as 111, 112, and 113. The CPPs 101-103 and the DRSs 111-113 may be communicatively linked through a connectivity system that can include any number of intermediate network devices, networks, or links, such as the RUS connectivity switches 121-124.

The control plane processors can be specialized computers, such as a server computer, a router, a switch, a gateway, or any other device that includes a processor, memory, and at least one user interface. The data routing switches can be one or more devices that can connect devices together on a computer network, and can forward data packets between computer networks, such as a line card.

In some implementations of the present disclosure, the RUS 100 connects a route update source, such as the CPP and a route update target, such as the DRS (target router), with reduced or minimal intrusiveness to the operation of the CPPs 101-103 and the DRSs 111-113. For the DRSs 111-113, operation may be affected only to the extent that the DRSs 111-113 see an arbitration for (routing) table access, which may cause a DRS to push back, or delay execution of a search instruction in certain situations. The RUS 100 may include three components, in one example implementation:

a) an Update Snoop Module (USM) circuitry, b) an Update Inject Module (UIM) circuitry and c) a RUS connectivity system (RCS) through which the USM can talk to the UIM. The RCS may include the RUS connectivity switches 121-124 for example. A USM is an element that may be embedded in RUS compliant CPP devices and a UIM is an element that may be embedded in RUS compliant DRS devices. Alternatively, or in addition, a USM component may be embedded in RUS compliant DRS devices and a UIM component may be embedded in RUS compliant CPP. The functions of the USM and UIM are described in greater detail below. Actual implementation of these components may take any number of forms, such as dedicated hardware embedded into the CPP or DRS.

Multiple Master/Remote Master RUS

In the example shown in FIG. 1, the RUS 100 includes multiple masters, which may refer to devices or logic that can update routing information. A CPP or a DRS or another device may be referred to as a master. In some instances, a DRS or other switch may also be referred to as a master when, for example, it can update its own routing table entries based on self-learning or aging. Devices in the RUS 100, such as a CPP or a DRS may be coupled to one or more communication interfaces, such as a snoop_out bus 151, an update_in bus 152 or both. The snoop_out bus 151 and the update_in bus 152 may refer to one or more logical busses, and may be implemented as at least a part of, or be mapped onto, a connectivity system which operates with one or more protocols, such as PCIe, Infiniband, or Ethernet, for example.

In an example of operation of two or more masters using the illustration of FIG. 1, the snoop_out bus 151 may receive a route update instruction, which is generated by a USM included in the CPP 101, which is a first master. In this example, since the DRS 111 includes a first routing table owned by the CPP 101, the routing update instruction may be included in a hardAPI packet addressed to the DRS 111. The DRS 111 can receive the route update instruction on the update_in bus 222 for use by a UIM included in the DRS 111 to update the first routing table owned by the CPP 101. Also in the example of FIG. 1, a second master may be present in the DRS 111 such that the snoop_out bus 221 may receive a route update instruction, which is generated by a USM included in the DRS 111. Since the second master in the DRS 111 owns a second routing table copy included in the CPP101, the route update instruction may be included in a hardAPI packet addressed to the CPP 101 such that the CPP 101 receives the route update instruction on the update_in bus 152 for use by a UIM included in the CPP 101 to update the second routing table. In other examples, there can be additional masters that own routing tables in the same or a different device. In addition, multiple devices that each include a UIM and respective routing table may receive a route update instruction from the same USM. Thus, within the RUS 100, there can be masters in communication with one or more devices to provide route update instructions.

Single Master RUS

Figure 2:
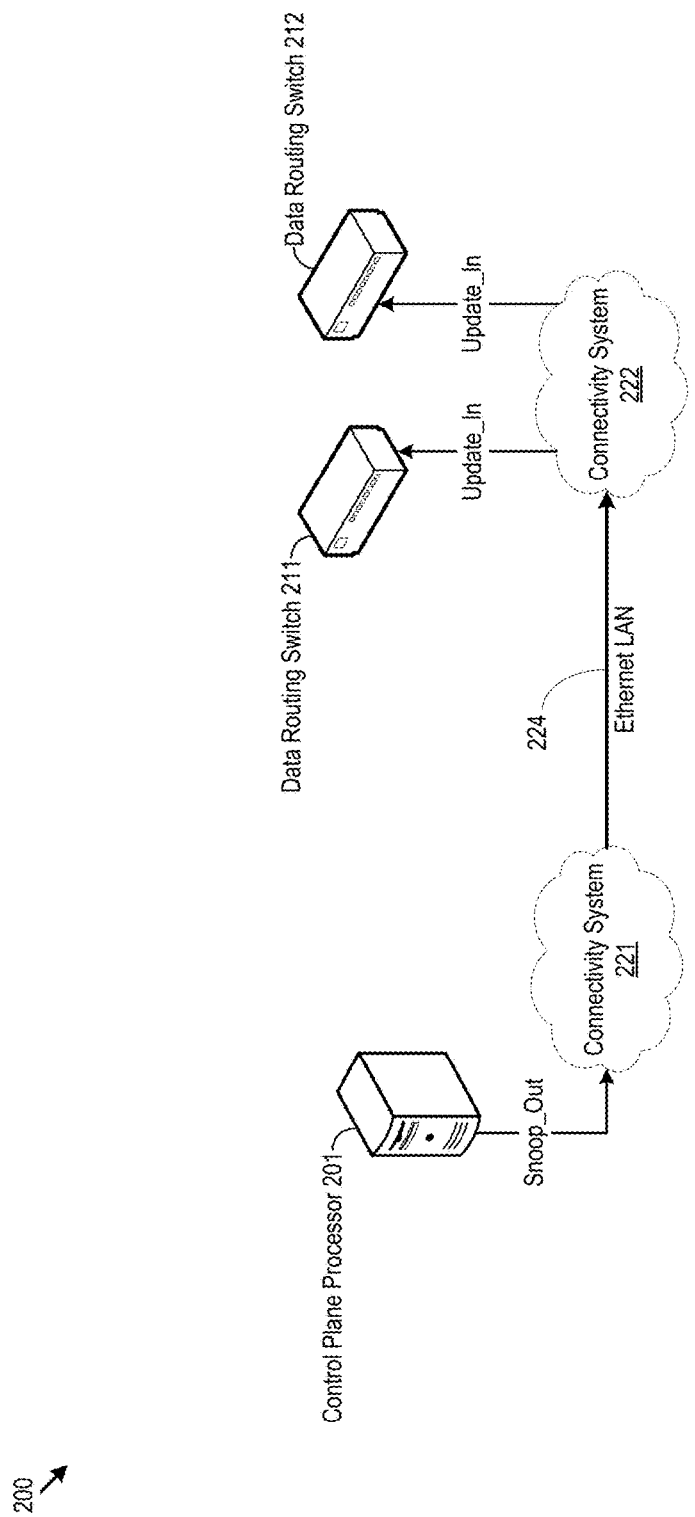
FIG. 2 depicts another example of a route update system.
Figure 3:
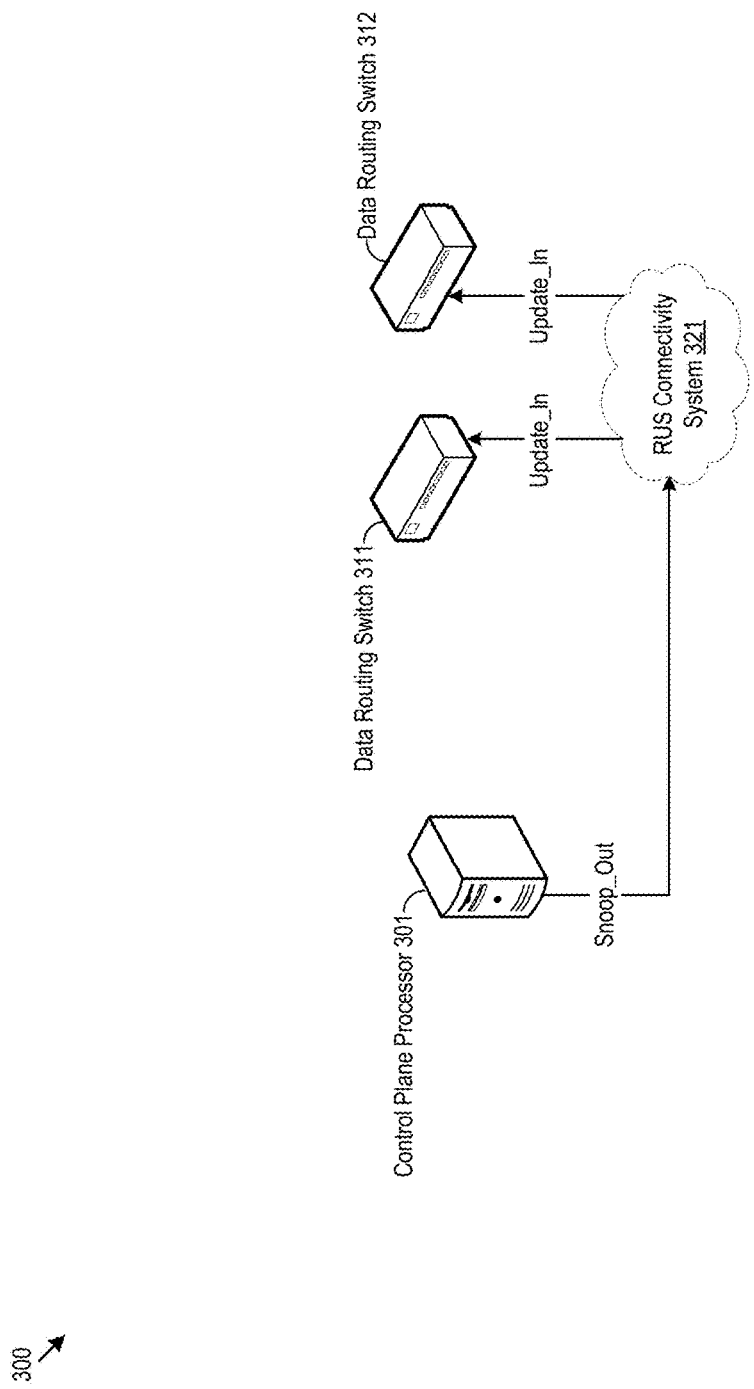
FIG. 3 shows another example of a route update system.
Figure 4:
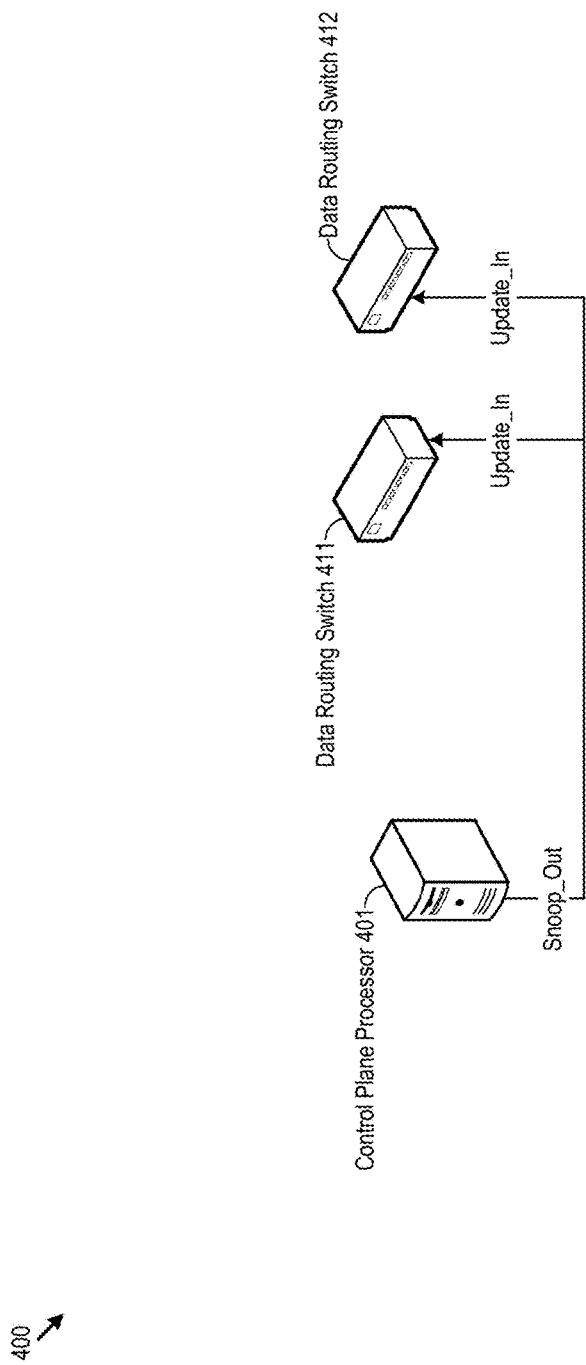
FIG. 4 illustrates yet another example of a route update system.

In some communication systems, a DRS may use routing tables without updating the routing tables themselves. In such systems, a CPP may take care of route table updates. Further, a single CPP may own the routing tables of all DRS devices in the RUS. The RUS 100 may be implemented in such a case, which may be referred to as a simple RUS. FIGS. 2-4 illustrate examples of different RUS configurations.

FIG. 2 shows an example of a RUS 200. The exemplary RUS 200 includes a CPP 201, which may be linked to any number of DRS's, such as DRSs 211 and 212 through a connectivity system 221 and a connectivity system 222. The connectivity system 221 and the connectivity system 222 can be local connectivity systems, which are interconnected by a network 224, such as an Ethernet LAN. The CPP 201 may be a master device located away from the DRSs 211 and 212, such as in a different building, server room or rack. Although, in this example, the CPP 201 and the DRSs 211 and 212 may be on the same local area network (LAN). The CPP 201 may include a USM that sends the routing table update instructions in a hardAPI packet through the connectivity system 221, such as through a InterLaken/PCIe/Infiniband (or Ethernet) interface to a local switch, such as an InterLaken/PCIe/Infiniband/Ethernet switch. From there, the update instruction packet can be sent over the LAN to another switch, such as an InterLaken/PCIe/Infiniband/Ethernet switch (e.g., part of the RUS connectivity system 222) that is local to the DRSs 211 and 212.

FIG. 3 shows an example of a RUS 300. The RUS 300 includes a CPP 301 and DRSs 311 and 312 linked through a connectivity system 321. In the exemplary RUS 300, the CPP 301 is located in same box or another box that is connected to the DRSs 311 and 312 through a cable or some other form of communication link carrying routing update instructions included in hardAPI packets as local device signals such as InterLaken/PCI/Infiniband signals via a switch, such as an intermediate connectivity InterLaken/PCIe/Infiniband switch.

FIG. 4 shows an example of a RUS 400. The RUS 400 includes a CPP 401 linked to DRSs 411 and 412. For example, the CPP 401 may be linked to the DRS 411 or 412 without an intermediate switch or other device, such as through a direct bus (serial or parallel) that connects the USM of the CPP 401 to a UIM of the DRS 411 or 412. Thus, in this example, the CPP 401 may reside on nearby boards in a device that includes a DRS 411 or 412, on a same board within the device, or on a same chip within the device and send routing update instructions via hardAPI packets.

Connectivity System and Data Structures

The RUS may include one or more communication interfaces that carry update information (such as a routing table update instruction) between a CPP and a DRS, and implementations of the interfaces may vary. These communication interfaces may include the snoop_out and update_in busses. The communication interface(s) of this example could be implemented as parallel busses if the CPP and DRS are on same die or package. On a circuit board or other circuit interconnection device, IL/ILA or PCIe would be possible bus implementations to carry the update information from the CPP to the DRS. If the CPP and DRS are located on different circuit boards, boxes, or devices, the physical representation of the communication interface may be PCIe/Infiniband or Ethernet, or via any other wired or wireless communication link.

Figure 5:
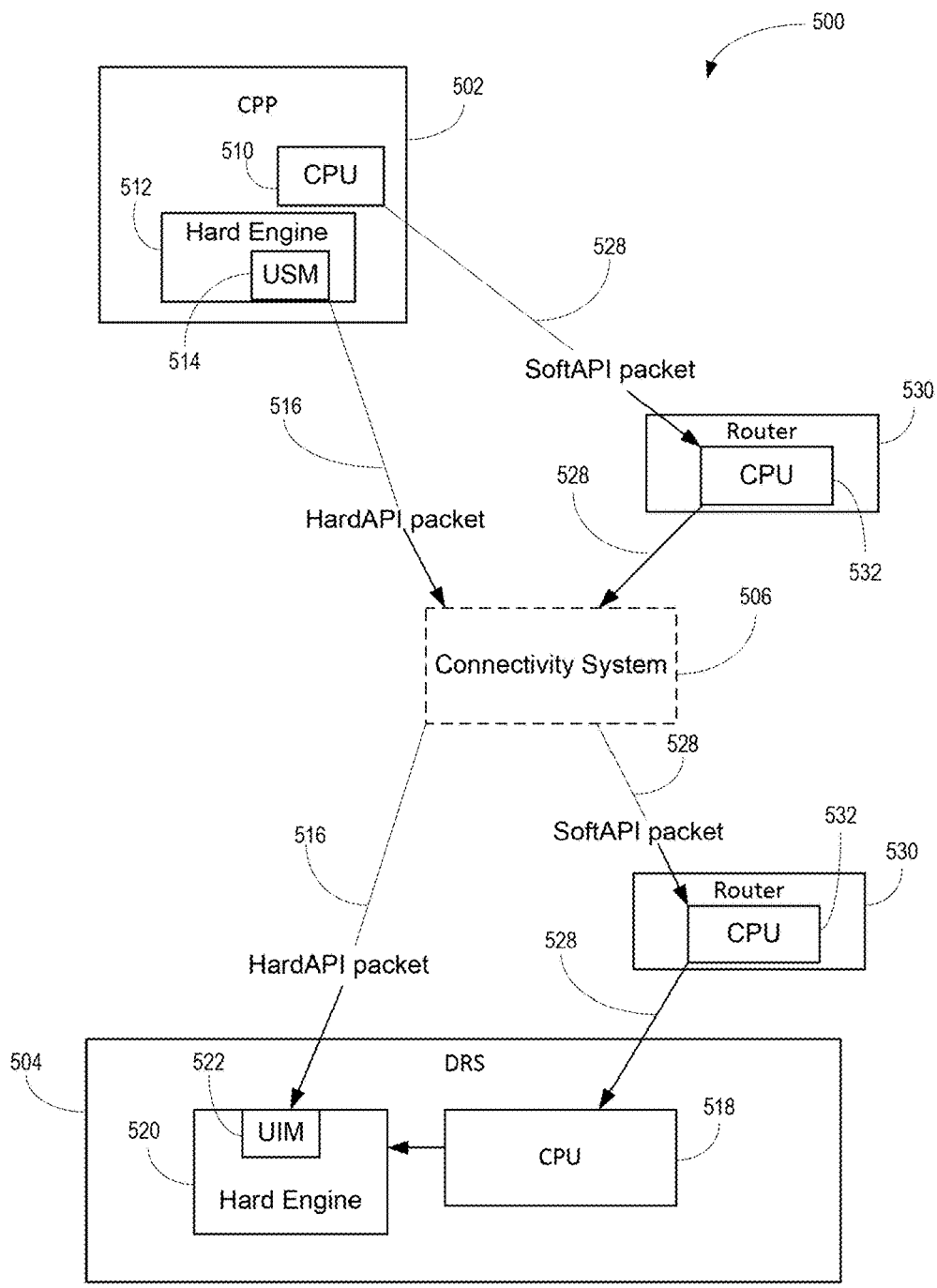
FIG. 5 is an example block diagram illustrating a communication path within a route update system.

FIG. 5 is an example block diagram illustrating a communication path within a route update system 500. The route update system 500 includes a CPP 502, a DRS 504, and a connectivity system 506. The CPP 502 includes a soft engine in the form of central processing unit 510 that executes instructions to implement a softAPI. A softAPI is defined as an application programming interface that uses a softAPI packet to communicate between two entities, such as an NFV/SDN controller, and a forwarding engine. As used herein, the term "soft engine" is defined as an entity implemented using a processor, microprocessor or other computing device that executes software to communicate using softAPI packets.

The CPP 502 also includes a hard engine 512 that includes update snoop module (USM) circuitry 514 operating as a source of hardAPI messages. As used herein, the term "hard engine" is defined as an entity implemented using hardware, such as a field programmable gate array (FPGA), an application specific integrated circuit (ASIC), a micro engine, or processing circuitry, such as circuitry included on the chip adjacent to the a processor, and which can communicate using hardAPI packets to update a routing table. Accordingly, the USM circuitry 514 can be logic hardware in the form of a field programmable gate array (FPGA), an application specific integrated circuit (ASIC), or processing circuitry, such as circuitry included on the chip adjacent to the processor 510. As used herein, the term hardAPI refers to an Application Programming Interface that uses hardAPI packets to communicate between entities such as an NFV/SDN controller and/or a packet forwarding engine.

During operation, the USM circuitry 514 can cooperatively operate with the CPU 510 to generate a route update instruction. The route update instruction thus can be transmitted by the CPU 510 as a hardAPI packet over a hardAPI packet communication path 516. As used herein, a hardAPI packet is defined as a network packet that has a payload limited to Open System Interconnect layer three or below (using the OSI (Open System Interconnection) reference model). Accordingly, a hardAPI packet is directly readable and useable by hardware (a hard engine) without complex transport or application layer states that are present in Open System Interconnect layer four and above packets. The hardAPI packet is provided to the connectivity system 506 via a hardAPI packet communication path 516. The connectivity system 506 can receive and transmit the hardAPI packet to the DRS 504 via the hardAPI packet communication path 516 using a protocol, such as PCIe, Infiniband, or Ethernet, for example, as previously discussed, based on a destination address included in the hardAPI packet. The hardAPI packet need not be converted or changed by the connectivity system 506 since the hardAPI packet is readable by a hard engine included in the DRS 504 (the destination) without any conversion or translation.

The DRS 504 can include a processor 518, and a hard engine 520 that includes update inject module (UIM) circuitry 522. By being included in the hard engine 520, the UIM circuitry 522 can be logic hardware in the form of a field programmable gate array (FPGA), an application specific integrated circuit (ASIC), or processing circuitry, such as circuitry included on a chip that includes the processor 518. Since the hardAPI packet is an Open System Interconnect layer three or below packet that is directly readable and useable by the DRS 504, the hardAPI packet may be provided directly to the UIM circuitry 522, bypassing processing by the CPU 518. Accordingly, the route update processing rate is substantially a function of the time required to generate the hardAPI packet.

In communication of route update instructions between the CPP and the DRS without the USM 514 and the UIM 522, a communication packet can be generated by a soft engine, such as the CPU 510, and transmitted as a softAPI packet along a softAPI packet communication path 528 using software defined networking (SDN). The softAPI packet communication path can include Control Data-Plane Interface (CDPI) drivers and CDPI agents such that the softAPI packet is processed through one or more routers 530, which each include at least one soft engine, such as a CPU 532, that processes the softAPI packet, and through the connectivity system 506 (if needed). In addition, the softAPI packet is received and processed by the CPU 518 at the DRS 504 to convert the softAPI packet to a format of individual memory update instructions. Thus, the softAPI packet is subject to processing along the softAPI packet communication path through multiple softAPIs CPU's so the rate at which the routing table is updated is dictated by the processing speeds of the multiple CPUs along the softAPI packet communication path 528. In some implementations, the routers 530 may be omitted and SoftAPI packets may travel from the CPP CPU 510 to the connectivity system 506 and from the connectivity system 506 to the DRS CPU 518 without going through the routers 530.

A network device may include one or more elements, circuitry, components, or other logic to support RUS connectivity. In some implementations, a device may implement these elements to support RUS connectivity in hardware or a combination of both hardware and software. For example, the device may implement a software driver that programs registers in the system, e.g., within a CPP, within a DRS, or both. The driver may also provide one or more APIs to manage a routing table update, for example to make manual updates, to see the performance of the update, and to perform table swapping in case of failures. As previously discussed, a device may implement the Update Snoop Module (USM) 514 or Update Inject Module (UIM) 522, as dedicated hardware or circuitry in the form of a hard engine. The USM 514 may be implemented by or added to the CPP device 502 and the UIM 522 may be implemented by or added to the DRS device 504. If a device is both a master as well as route table holder (such as a DRS 504 that can update its own routing tables), the device may implement both the USM 514 and UIM 522.

A communication protocol for the hardAPI packets is fully and directly useable by the UIM 522. Table 2 provides some exemplary data structure details of a UIM instruction buffer, data structure that illustrates the communication protocols used by the USM 514 and the UIM 522 to generate hardAPI packets.

TABLE 2

| Seq Num | Structure | Example Width | Example |
|---|---|---|---|
| 1 | UpdateInstructionPacket | Variable | One possible implementation of the UpdateInstructionPacket is as follows: [UHW-1:0]: UpdatePktHeaderBits, UpdateInstrctions, UpdateTrailBits} Where: UpdatePktHeaderBits are explained next UpdateTrailBits: are mostly CRC bits in case of OSI Layer two packet. UpdateInstructions: |

TABLE 2-continued

| Seq Num | Structure | Example Width | Example |
|---|---|---|---|
|  |  |  | {UpdateInstruction, UpdateInstruction, UpdateInstruction, , . . . }<br>UpdateInstruction - Format-1<br>{UpdateLocation[31:0],<br>UpdateData[63:0]}<br>UpdateInstructions - Format-2<br>{UpdateRouteInfo}<br>UpdateRouteInfo:<br>{RouteInfoSizeInBytes[15:0], //In Bytes<br>RouteValueType[15:0],<br>RouteValue[RouteInfoSize * 8-16:0]}<br>[NOTE: It is expected that RouteValueType can be interpreted by a hardware state machine or a micro-coded engine and update the route table memory.] |
| 2 | UpdatePktHeaderBits | UHW | example implementations of the UpdatePktHeaderBits include:<br>When CPP and DRS are in same LAN (including VLANs)<br>{UIM-MAC-Address[47:0],<br>USM-MAC-Address[47:0],<br>Ethernet/VLANType[15:0],<br>VLANTag[31:0],<br>UpdateInstructionSetHeader}<br>When CPP and DRS are connected via PCI Bridge<br>{PCIeHeader[63:0],<br>UIMAddress[31:0],<br>UpdateInstructionSetHeader}<br>UpdateInstructionSetHeader:<br>{NumberOfUpdateInstructions[15:0],<br>UpdateAttributes[15:0],<br>USMSignature[31:0]} // Optional<br>UpdateAttributes[15:0]:<br>{[0]: ValidBit<br>[1]: AtomicUpdate<br>[2]: SignaturePresent<br>[3]: Endian (1'b0: Big Endian, 1'b1: Little Endian)<br>[4]: EncryptionEnabled (Encryption key is in UIM) // Defined between API Translator and UIM<br>[15:5]: To Be Defined} |
| 3 | ClockCount | TDW | The running clock count, TDW wide counter. The clock used may be the local clock of the device. |

Example implementations of a data structure for register/memory details in the USM 514 and the UIM 522 for the purpose of recovery from a loss of data events, such as failures, are provided in Table 3:

TABLE 3

| Seq. Num | Register | Example Width | Example |
|---|---|---|---|
| 1 | LastUpdate Register | UHW + TDW + UAW + UDW | One possible implementation of the LastUpdate Register is as follows:<br>{LastUpdatePktHeaderBits[UHW-1:0],<br>LastClockCount[TDW-1:0],<br>LastUpdateAddress[UAW-1:0],<br>LastUpdateData[UDW-1:0]}<br>Where the fields are self-explanatory.<br>LastUpdatePktHeaderBits may have the structure of UpdatePktHeaderBits (see Table 2)<br>LastClockCount may have the structure of ClockCount (see Table 2)<br>The register may have a shadow that gets updated when lowest bits of this register are read. The |

TABLE 3-continued

| Seq. Num | Register | Example Width | Example |
|---|---|---|---|
| | | | remaining parts of the register may be read from shadow register (in other words, the shadow need not implement the lowest part of the register). |
| 2 | UpdatesSinceLastRead Register | 32 + 2 * UAW | One possible implementation of the UpdatesSinceLastRead register is as follows: {UpdateCountSinceLastRead[31:0], MaxUpdateAddrSinceLastRead[UAW-1:0], MinUpdateAddrSinceLastRead[UAW-1:0]} The last read event may be defined when lowest data bits of the LastUpdate register are read. At that time, the full value may be captured in a shadow and the source register can be cleared. In some implementations, no update event is lost in the process. The updates that happened at or before the clock when the LastUpdate register is updated may be part of the shadow register and those that happen after that clock may go into the source/current register. The complete read data may go from shadow only. |
| 3 | UpdateList | ULD × UAW | Provides a list of update addresses. |
| 4 | USM Configuration Register (one per update address space) | UAW * 3 | One possible implementation of the USM Configuration Register is as follows: {AtomicityMask[UAW-1:0], RangeMask[UAW-1:0], AddressSpaceBase[UAW-1:0]} AddressSpaceBase: This (along with RangeMask) may define the address range that need be snooped (see equation below). RangeMask: If the incoming address is address_in[UAW-1:0] such that address_in & ~RangeMask == AddressSpaceBase, then address_in is expected to be a "hit" and it is a candidate for snooping and capturing. AtomicityMask: If two addresses are such that Address0 & ~AtomicityMask == Address1 & ~AtomicityMask, then they need be written without intervening access. If AtomicityMask = {UAW{1'b0}}, the atomicity is said not to be applicable for this address space. |

The USM circuitry 514 can be physically positioned as close to the processor 510 in the CPP 502 as possible. In an example implementation, the USM circuitry 514 is a hard engine in the form of a hardware circuit that is placed on the same die as that of processing cores of CPP 502. Also, in an example, the CPP 502 can be positioned as close to a SDN/NFV controller as possible. In some examples, the CPP 502 can be the SDN/NFV controller itself. The translation of the APIs enables update instructions at the UIM circuitry 522 that a hardware state machine and/or micro-coded engine can directly interpret and make an update to routing table memory.

Figure 6:
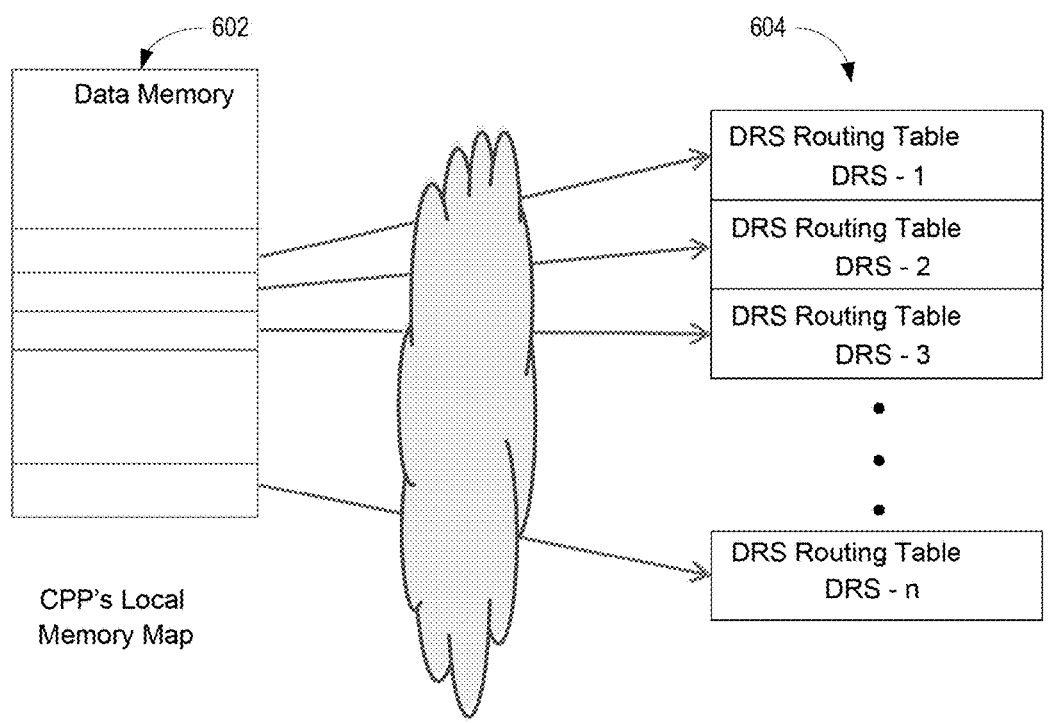
FIG. 6 is an example of mapping of local data memory storage of a CPP to routing table memories of a DRS.

FIG. 6 is an example of mapping of local data memory storage 602 of the CPP 502 to routing table memories 604 of the DRS 504. In this example, a route update instruction is written to different routing tables in the DRS 504 routing table memory. The CPP 502 has a local data memory that mirrors the routing table stored in the memory of the DRS 504. Thus, from the perspective of the CPP 502, route update instructions are written to local data memory 602, such as to different image locations in local data memory 602, which are mapped to one or more routing table memories/image locations in one or more of the DRS 504. Such writing of a route update instructions to image locations in the local data memory 602 initiates a process to transmit route update instructions from the USM circuitry 514 to the UIM circuitry 522. The initiation of the process to transmit a route update instruction may be based on the USM circuitry monitoring a memory interface bus, and detecting the writing of the route update instruction into local data memory 602. The local data memory 602 may be in the application space of CPU 510, thus avoiding the need of kernel calls or expensive switching between application mode and kernel modes while making routing table updates to the local data memory 602.

Update Snoop Module (USM) Circuitry

Figure 7:
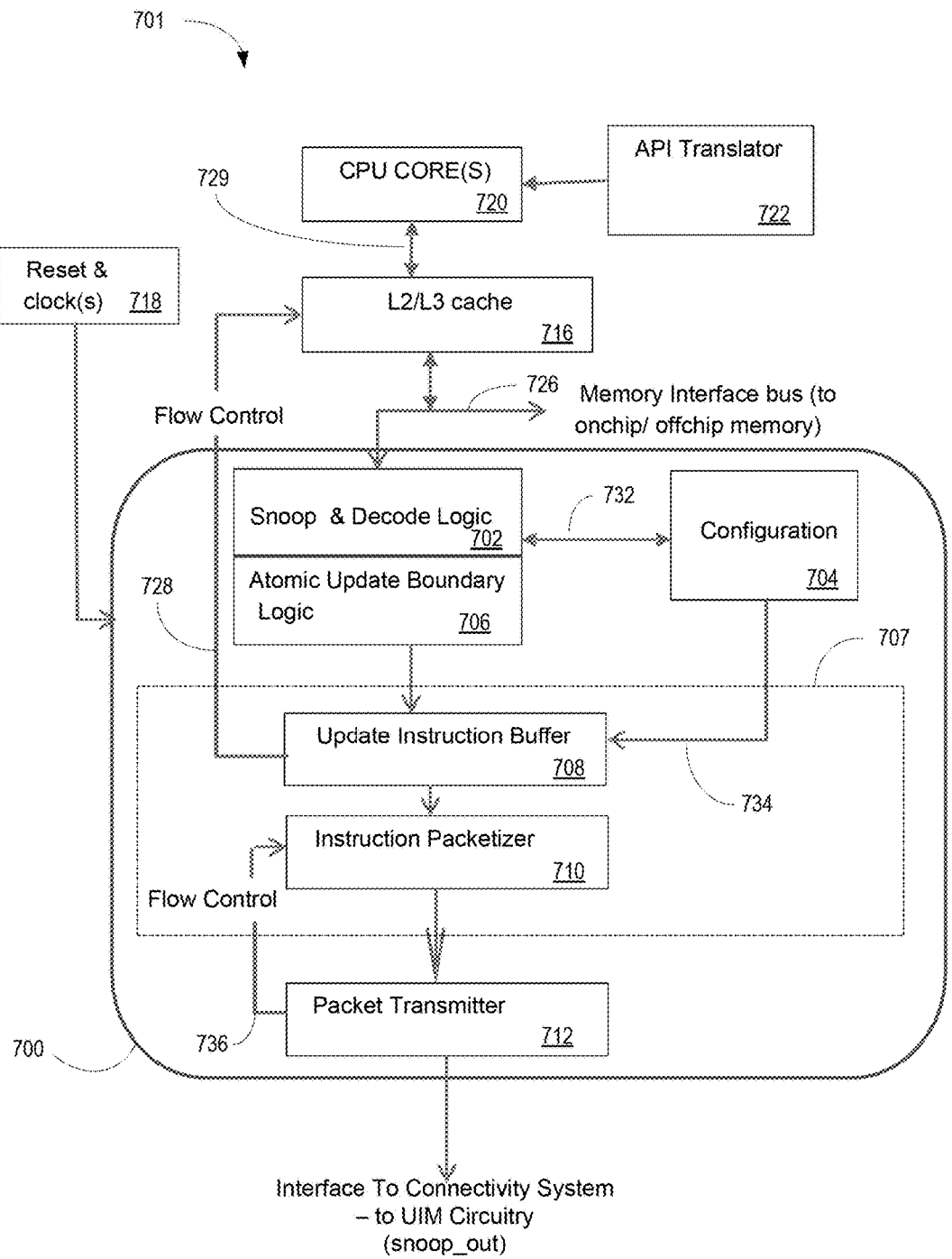
FIG. 7 illustrates an example of control plane processor circuitry that includes an example of an update snoop module.

FIG. 7 illustrates an example of an update snoop module (USM) 700 that may be implemented in hardware as circuitry of a hardware engine. The USM 700 may be implemented into a CPP device 701. The USM 700 may include USM snoop and decode logic circuitry 702, configuration circuitry 704, such as registers, atomic update boundary logic circuitry 706, hardware packet generation logic 707, and packet transmitter circuitry 712. The hardware packet generation logic 707 can include an update instruction buffer 708 and instruction packetizer circuitry 710. The USM 700 may include any number of interfaces, and may access a cache to memory interface, such as the L2/L3 cache 716, reset and clocks circuitry 718, and one or more CPU cores 720, all of which may be separate devices, or separate modules that are part of an SOC, which also contains the USM circuitry 700. API translator circuitry 722 included within the CPP device 701 may include hardware and software executable to perform the functionality described. One or more CPU Core(s) 720 included in the CPP 701 can be included as part of the API translator circuitry 722 and execute software included in the API circuitry 722. In an example, software executed within the API translator circuitry 722 may be provided by device suppliers that provide DRS devices.

The API translator circuitry 722 can execute high level route maintenance/update APIs, such as RUA APIs, which can be defined by a standards body such as OpenFlow, as previously discussed, to generate a set of local memory updates. These local memory updates can be packaged and converted by the USM circuitry 700 into HardAPIs that are hardware interpretable at the DRS, and more specifically, by the UIM circuitry. These local memory update instructions are transmitted over a memory interface bus 726 for use by the CPP 701 to update onchip or offchip local memory storage (local data memory) of the CPP 701. The memory storage of the CPP 701 can mirror a routing table stored in the memory storage of one or more DRS so that the CPP 701 can make changes locally in the local data memory to the currently stored routing.

The API translator circuitry 722, in addition to translation functionality, can also include functionality for enabling the UIM 522 to perform data processing, authentication and data integrity, such as by base address shift, data encryption, Endian (Big Endian, Little Endian) conversion and/or compression. For example, as part of the translation process, an authentication token, such as a certificate or a key may be included in the hard engine interpretable route update instructions so that UIM circuitry that receives one of the update instructions can authenticate that the originator of the update instruction was the CPP 701 from which the update instruction was received. In addition, the API translator circuitry 722, may provide some form of encryption or other form of data integrity techniques so that UIM circuitry that receives one of the update instructions can verify that the update instruction was not tampered with or otherwise compromised after being generated at the CPP 701 from which the update instruction was received. In an example, the authentication and data processing can be indicated in the update attribute bits of Table 2, as previously discussed. By making the API translator circuitry 722 work on local memory, a major overhead related to invocation of a driver (for example a PCI driver) is avoided.

Updates, including routing updates may be performed by the CPU core 720 using cache to read programs and data efficiently from memory. The illustrated L2/L3 cache 716 can be coupled with the CPU core 720 by a read/write address and data path 729, and can be positioned between data memory that is located on or off chip where update instructions are to be written and the CPU core 720. In an example implementation, the L2/L3 cache 716 may be the last cache prior to the memory interface bus 726 with which the local memory update instructions (also referred below as write transactions) are transmitted to the onchip or offchip memory storage of the CPP 701, as illustrated. The L2/L3 cache 716 is the last cache so that the USM circuitry 700 is not positioned between the CPU core 720 and the L2/L3 cache 716, but is instead positioned as close as possible (close coupled) with the CPU core 720, but after all the cache layers. The reset and clocks circuitry 718 may represents utilities that are provided to the USM circuitry 700 and/or the CPP 701, when the USM circuitry 700 is implemented as on-die circuitry, or as a separate chip/FPGA entity.

The USM circuitry 700 uses predetermined snoop address filters that can be stored in the configuration circuitry 704 and provided over an address filter line 732. The snoop address filters can define address ranges that need be snooped (for update purpose) and captured. The configuration circuitry 704 can also define update atomicity behavior performed with the atomic update boundary logic circuitry 706. In general, update atomicity behavior refers to the capability of the USM/UIM circuitry to perform all or none updates or changes in routing. The configuration circuitry 704 may include one or more registers in the form of, for example, the address range registers included in the example communication protocols described in Table 2. In an example configuration, the USM 700 includes one register per update address space. These registers can be updated through, for example, a separate I/O bus, which can be connected to internal peripheral bus of the CPU core 720.

During operation, the snoop and decode logic circuitry 702 may monitor write transactions occurring on the memory interface bus 726 to identify routing update transactions. When a write transaction message satisfies predetermined conditions, the snoop and decode logic circuitry 702 can identify the write message as a routing update transaction. Once write transaction messages are identified as routing update transactions, the snoop and decode logic circuitry 702 can capture a copy of such write transaction messages. In an example configuration, there can be two types of capture conditions for routing update transaction messages—a first condition to identify and capture update messages for local configuration registers of the CPP 701 based on write transactions, and a second condition to identify and capture write transactions that are route update instructions mapped to routing table memory. If the address in the write transaction being snooped belongs to a local configuration register, the local configuration register included in the configuration circuitry 704 can be updated by the snoop and decode logic circuitry 702 with write data over a register line 732. Examples of such configuration registers are the address range registers that define mapping to routing tables of Data Routing Switches (DRS) illustrated in Table 2. Where the second capture condition occurs, because the write routing update transaction is a routing table update instruction, the routing table update instruction may be captured and indicated to the hardware packet generation circuitry 707. In an example, a copy of the route update instruction may be transmitted to the packet generation circuitry 707, for temporary storage in the update instruction buffer circuitry 708. In other examples, other forms of indications of a routing updating instruction may be provided to the packet generation circuitry 707 as an indication of the captured route update instruction.

The atomic update boundary logic circuitry 706 may monitor those routing update instructions captured by the snoop and decode logic circuitry 702 to determine if atomicity is warranted because the update to the routing table has to be done in an atomic fashion to update a group of memory locations in the routing table. The atomic update boundary logic circuitry 706 processes the route update instructions and determines whether to associate/embed a parameter in the write instructions that is indicative of an atomicity requirement. The atomicity parameter can be a flag or other indicator, which is read by the UIM circuitry upon receipt of the hardAPI packet. The atomicity parameter may also include an indicator that associates multiple hardAPI packets that should be part of an atomic routing table memory update.

In examples the packet transmitter circuitry 712 need not wait for an "acknowledge" message or other acknowledgement indication from an external source before transferring the route update instructions and update message out, though such acknowledgement capability may be optionally implemented. Having such a capability can make the USM 700 compatible with various bus interfaces (connectivity systems). It is noted, however, that connectivity systems such as PCIe or Infiniband may automatically provide such a capability and therefore any form of acknowledgment may be omitted and the accompanying delay may be avoided. In some examples, the address space of interest for the USM circuitry 700 may require write-through capabilities for the L2/L3 cache circuitry 716. In such examples, the write through capabilities could be implemented through a hardware update or software programming.

The update instruction buffer circuitry 708 of the USM 700 may store route update instructions to meet atomicity (and, optionally or in addition, transport efficiency) requirements and to allow for frequency differences between clocks, such as between a connectivity system clock and the RUS clock (Table 1). The update instruction buffer 708 may support instruction buffering to meet the needs of packetization requirements and atomicity grouping requirements, and also to address differences in transport speed and local clock speed. The update instruction buffer 708 may be implemented as a first in, first out (FIFO) buffer, and may have a number of predetermined threshold parameters associated therewith. In an example, the predetermined threshold parameters can include AlmostFull and AlmostEmpty threshold values discussed with regard to Table 1. The predetermined threshold parameters may be contained in the configuration circuitry 704 and provided to the update instruction buffer 708 on a threshold parameters line 734. When the occupancy of route update instructions in the update instruction buffer 708 reaches a value of update instructions equal to the a predetermined values, such as AlmostFull level, the USM circuitry 700 may assert flow control such as usm_cpu_hold on a flow control line. Once asserted, the USM circuitry 700 may maintain flow control until buffer occupancy of the update instruction buffer 708 reaches a predetermined threshold level, such as the AlmostEmpty level.

The instruction packetizer circuitry 710 creates/generates each of the hardAPI packets as a single data layer packet using the route update instructions stored in the update instruction buffer circuitry 708. Since an update to a route can include updates to many different memory locations in a routing table, the instruction packetizer 710 can confirm that all update instructions that belong to one atomic update are packaged together in a group in a single hardAPI packet, or in a series of hardAPI packets. Where the update instructions are in multiple hardAPI packets, an indicator can be included to delay update processing at the UIM circuitry until the entire set of route update instructions are received at the UIM circuitry. Since the payload of each hardAPI packet includes a group of route update instructions in a payload limited to Open System Interconnect layer three or below that is directly compatible with the UIM circuitry, the UIM circuitry can directly parse the hardAPI packet and execute the update instructions without processing by a CPU.

In addition to extracting and creating a payload for each of the hardAPI packets, the instruction packetizer circuitry 710 can also generate and attach a packet transport header to each hardAPI packet. The packet transport header is in a hardware compatible format, and can be directly parsed by the UIM in the DRS, which is identified in the packet transport header. Information included in the packet transport header can include, for example, a source media access control (MAC) and/or internet protocol (IP) Address, a destination MAC and/or IP Address, a VLAN ID, a PCIe protocol, or some other unique identifier(s) so that the hardAPI packet can directly reach the UIM circuitry of the intended DRS without further CPU processing. Examples of communication protocols/path addressing for example hardAPI packets have been described elsewhere.

The packet transmitter circuitry 712 can transmit hardAPI packets generated by the instruction packetizer circuitry 710 over the snoop_out bus (see FIGS. 1-4) which is included in the connectivity system. Transmission of the hardAPI packets may be over the connectivity system to which the USM circuitry and the UIM circuitry are connected, such as PCIe/Infiniband/Ethernet or other connectivity system. Accordingly, the packet transmitter circuitry 712 may perform handshaking, destination addressing, and communication protocols to use the connectivity system. In addition, the transmitter circuitry 712 can support flow control related to the connectivity system. Thus, the transmitter circuitry 712 can transmit an instruction over a flow control line 736 to the instruction packetizer circuitry 710 to delay or accelerate generation of a next hardAPI packet in accordance with the operational characteristics of the connectivity system. For example, the packet transmitter circuitry 712 can maintain flow control, such as in the case of an Ethernet interface in which flow control was received for a duration of a 512 bit time, the transmitter circuitry 712 can request that the instruction packetizer circuitry 710 hold the hardAPI packets for the 512 bit time being dictated by the connectivity system.

Thus, the USM 700 may perform two different types of flow control. In a first type of flow control, the update instruction buffer circuitry 708 can perform flow control with a first flow control signal provide to the L2/L3 cache 716 on the flow control line 728 to limit the input of route update instructions to the memory interface bus 726, if the buffer circuitry 708 reaches the maximum continuous allowed update for a given address space (for example, based on internal FIFO threshold). The USM 700 may use the first flow control signal, such as a usm_cpu_hold signal, where the CPU core 720 provides for such a freezing capability. The advantage of such a freezing capability is to make the update speed of the USM circuitry 700 transparent to the API translator circuitry 722. In a second type of flow control, the packet transmitter circuitry 712 can match the output of the USM to the available bandwidth or throughput of the connectivity system with a second flow control signal provided on the flow control line 736 to regulate the generation of hardAPI packets by the packet generation circuitry 707 by regulation of the instruction packetizer circuitry 710. As one or the other of the first and second flow control signals are initiated, the other of the first and second flow control signals also may be implemented as needed to manage throughput of route update instructions. Since a routing table update rate may be less or more than a data transfer rate that the USM 700 included with the CPP 701 can transport to DRS devices, the first or second flow control signals may cooperatively operate to maximize the efficiency of the CPU core 720 and the connectivity system. In addition, such cooperative operation using the two flow control signals may be used to coordinate operation of the UIM 700, such as by implementing (average) update speed matching.

Update Inject Module (UIM) Circuitry

Figure 8:
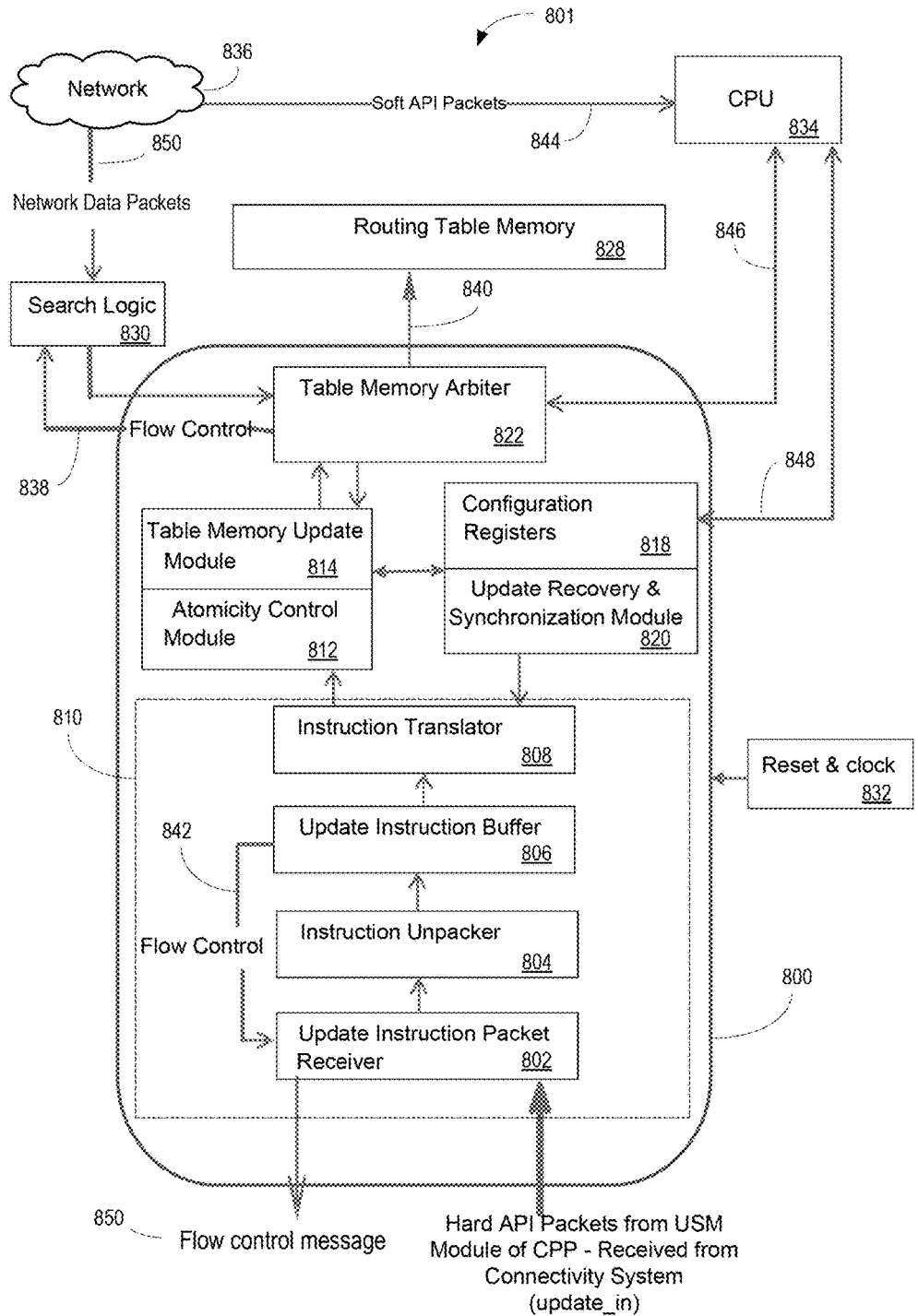
FIG. 8 shows an example of an update inject module (UIM), which may be implemented in hardware as circuitry.

FIG. 8 shows an example of an update inject module (UIM) 800, which may be implemented in hardware as circuitry of a hard engine. The UIM circuitry 800 may be included in a hard engine implemented into a DRS device 801, such as router device comprising a line card. The UIM circuitry 800 may include hardAPI packet processing circuitry 810. The hardAPI packet processing circuitry 810 can include update instruction packet receiver circuitry 802, instruction unpacker circuitry 804, update instruction buffer circuitry 806, and instructor translator circuitry 808. The UIM circuitry 800 can also include atomicity control module circuitry 812, table memory update module circuitry 814, configuration registers circuitry 818, update recovery and synchronization module circuitry 820, and table memory arbiter circuitry 822. The UIM 800 may include any number of interfaces, and may access a routing table memory 828, search logic circuitry 830, reset and clocks circuitry 832, and a soft engine in the form of a CPU 834, all of which may be separate devices, or separate modules that are part of an SOC which also contains the hard engine that includes the UIM circuitry 800.

The CPU 834 is a soft engine that is capable of communicating with a network 836 and receive and process softAPI packets. The softAPI packets are received by the CPU 834 over a network data packet line 844. Similar to the CPU 518 discussed with reference to FIG. 5, the CPU 834 can operate as a softAPI to process softAPI packets. The CPU 834 can process the softAPI packets to extract routing instruction updates. The CPU 834 also includes functionality to generate read/write routing update instructions from the data extracted from the softAPI packets. Thus, the CPU 834 can learn the network 836, and update the routing table memory 828 by generating direct write route update instructions to the routing table memory 828. Direct write route update instructions may be sent on a route update line 846 to the table memory arbiter 822. The table memory arbiter 822 may selectively route the direct write route update instructions from the CPU 834 to the routing table memory 828.

In addition, the CPU 834 may be used to program and read back the configuration registers circuitry 818 of the UIM circuitry 800 over a registry line 848. Programming of the UIM circuitry 800 and the DRS device 801 may occur through a common programmed input/output (PIO) bus forming the registry line 848. The CPU 834 can manage the reading/writing of various resources of the DRS device 801.

The CPU 834 can be implemented with a combination of hardware and software as a soft engine, resulting in undesirable delay due to CPU cycle time, and therefore can be used mainly during debugging or initialization time. During run-time, the CPU 834 is generally not used to maintain the routing table in the routing table memory 828 since individual instructions to update an individual location (or image) in the routing table memory 828 received via the CPU 834 result in undesirably slow operation.

The search logic circuitry 830 can receive over a network data packet line 850 network data packets from the network 836 that are in need of routing by the DRS 801. As used herein, the terms network data packets refers to data packets that are be transmitted from a source to a destination by passing through the DRS 801. The destination can be an address of a destination device, which is other than the DRS 801. Accordingly, such network data packets are different than the hardAPI packets since they are not addressed to local DRS 801 whereas the hardAPI packets are addressed to the DRS 801 for receipt by the UIM 800. The search logic circuitry 830 may perform routing decisions by parsing certain portions of the network data packets, such as a header included in such network data packets. The parsed portions of the header can be used by the search logic circuitry 830 to look up routing information stored in the routing table memory 828 and make one of two decisions: (a) Whether or not to forward the packet and, (b) If it is decided to forward the packet, decide where to send the packet based on one or more stored entries retrieved from the routing table.

The search logic circuitry 830 may also include network data packet editing functionality, as well as functionality to generate route search requests. Thus, the search logic circuitry 830 can learn the network 836, generate route search requests to read routing information from the routing table memory 828, and modify the routing of the network data packets based on the routing information retrieved. Route search requests may be used by the search logic circuitry 830 to search for and retrieve from the routing table memory 828 a route for a received network data packet. Thus, the search logic circuitry 830 can access the routing table memory 828 to extract stored routing table information by generation of route search requests. Routing information provided by the routing table memory 828 in response to the route search requests may be used by the search logic circuitry 830 to route the network data packets by modifying or confirming the header information included in the network data packets.

The search logic circuitry 830 can send read route search request messages through the table memory arbiter 822 to the routing table memory 828 to request stored information. The search logic circuitry 830 may also perform other functions, such as management of aging routing information stored in the routing table memory 828. For example, the search logic circuitry 830 can search for and eliminate routing table entries in the routing table memory that are not used/accessed for a predetermined period of time, such as six months.

The routing table memory 828 is where route information is stored and used by the search logic circuitry 830 to decide the forwarding (destination as well as desirability) of the packets. The routing table memory 828 can be on chip or off chip or can be a mix of the two. Accordingly, the routing table memory 828 may be located in the DRS 801 and/or external to the DRS 801. As previously discussed, the routing table memory 828 may be a mirror image of the CPP memory routing table information. The reset and clock circuitry 832 can provide utilities for the UIM circuitry 800, whether the UIM circuitry 800 is implemented as on-die circuit or as separate chip/FPGA entity.

The configuration registers circuitry 818 includes various configurations of registers that maintain parameters which configure the operation of the UIM circuitry 800. Such parameters may include data and information related to translation, decryption and other operational functionality used by the UIM circuitry 800. As previously mentioned, the CPU 834 may be used to program (write) and read back the configuration registers 818 of the UIM 800. The reading and writing of the configuration registers 818 with the CPU 834 can take place over the registry line 848, such as a PIO bus.

The update recovery and synchronization module circuitry 820 can dynamically capture summary information regarding route instruction updates, along with a current time stamp. The captured summary information and current time stamp can be stored in memory. The dynamic capture of summary information can provide for data checking and also recovery, based on the time stamps, of a most recent routing table update of the routing table memory when certain failures occur. Recovery and synchronization related data structures have been discussed elsewhere. The update synchronization and recovery module circuitry 820 can alternatively, or in addition, dynamically capture memory table updates initiated by the CPU 834 and/or the table memory update module circuitry 814.

The table memory arbiter circuitry 822 can operate to provide multiple paths to a memory bus 840, which provides access to the routing table memory 828. The table memory arbiter circuitry 822 can receive access requests from either the CPU 834, or the table memory update module circuitry 814, or from the search logic circuitry 830. Upon granting a request, the table memory arbiter circuitry 822 may open an exclusive read/write path from the CPU 834, the table memory update module circuitry 814, or the search logic circuitry 830 requesting access to the routing table memory 828 to allow updates to, or data extraction from, the routing table memory 828. Thus, in the illustrated example, the table memory arbiter circuitry 822 can operate as a switch that switches between the CPU 834, the search logic 830 and the table memory update module 814 to selectively provide exclusive access to the routing table memory 828. In the illustrated example, the table memory arbiter 822 is included in the UIM 800.

The table memory arbiter circuitry 822 may also perform flow control by generating flow control signals on a flow control line 838. Flow control may be initiated by the table memory arbiter circuitry 822 as a result of too many route search requests (read requests) being received from the search logic circuitry 830. In addition, or alternatively, flow control to reduce, limit or stop the frequency of provision of network data packets (and corresponding route update requests) may be initiated by the table memory arbiter circuitry 822 during a period of atomic update requests being performed by the table memory update module circuitry 814. In other words, the table memory arbiter circuitry 822 can initiate flow control to stop the search logic circuitry 830 from searching the routing table memory, in order for a route update instruction identified as atomic to be fully completed while the table memory arbiter circuitry 822 is allowing access by the table memory update module circuitry 822 to the routing table memory 828. Thus, flow control by the table memory arbiter circuitry 822 can be initiated in coordination with atomic update being performed based on the atomicity control module circuitry 812. This allows a completed update of the routing table memory 828 to take effect prior to receipt of access from the search logic circuitry 830.

As another implementation, the UIM 800 may not have direct access to the routing table memory 828, and the UIM 800 may access an intermediate bus to reach the target memory instead. (see FIG. 9) If that is the case, a route search request from the search logic 830 would not come to the table memory arbiter 822 included in UIM 800 and likewise the UIM 800 would not have to push back the search request, such as with a flow control message.

The table memory update module circuitry 814 can generate and perform read/writes via the table memory arbiter 822. The read/writes may be performed as read/writes, or as read/modify/writes. An example of a read/modify/write is in the case where the number of bits in the route modification instructions do not match the width of the memory location in the routing table memory 828, and the table memory update module circuitry 814 modifies accordingly prior to sending a write instruction that includes a route instruction update. The table memory update module circuitry 814 can perform at least two things, which are: 1) to request the table memory arbiter 822 to provide exclusive access to a memory bus 840 to write the table memory; and 2) to send the write/update instructions to table memory once exclusive access is granted. Alternatively, or in addition, the table memory update module circuitry 814 could include read-modify-write to table memory. The arbitration interface works in conjunction with Atomicity Control Module.

The atomicity control module circuitry 812 can monitor for and detect atomicity identifiers in the hardAPI packet. In addition, the atomicity control module circuitry 812 can instruct the table memory update module circuitry 814 to direct the table memory arbiter 822 to maintain the grant of access to the routing table memory 828 via the memory bus 840, until all route update instructions that are indicated as subject to an atomicity requirement are completed. Route update instructions indicated as subject to an atomicity requirement may include those that are indicated as a group of atomic route update instructions, and/or one or more route update instructions that update a group of memory locations in the routing table memory. In these situations, the table memory arbiter circuitry 822 may perform flow control via the flow control line 838 to the search logic circuitry 830, as previously discussed.

During operation, hardAPI packets can be received at the hardAPI packet processing circuitry 810. The hardAPI packets can be received from the connectivity system as previously discussed, which, in some examples could be the network 836, such as in an Ethernet protocol, but in other examples may be other communication paths, such as PCIe, or Infiniband, or other communication protocol/path. The hardAPI packets can be sent by USM circuitry 700 included in an upstream CPP device 701. (FIG. 7)

Within the hardAPI packet processing circuitry 810, the update instruction packet receiver 802 can receive hardAPI packets on the update_in bus (see FIGS. 1-4) which is included in the connectivity system. The update instruction packet receiver 802 can receive and analyze the hardAPI packets to confirm the authorization and integrity of the hardAPI packet as a security measure. For example, the update instruction packet receiver 802 may perform a signature authentication by identifying and confirming unique device identifiers, such as a MAC and/or IP addresses included in the hardAPI packets. Thus, the update instruction packet receiver 802 may, for example, confirm that the received destination address, such as a MAC and/or IP address, included in the hardAPI packet belongs to the DRS, and that the source MAC and/or IP address included in the hardAPI packet belongs to the CPP device from which the hardAPI packet was expected to be sent.

The instruction unpacker circuitry 804, included within the hardAPI packet processing circuitry 810, can remove any route update header present in the payload (single data layer) or transport header of the packet. For example, the instruction unpacker circuitry 804 can remove and analyze an instruction packet header. In addition, the instruction unpacker circuitry 804 can perform authentication checks on the received hardAPI packet to protect the sanctity of the routing table. Authentication may include, for example, verification of the validity of a source signature (USMSignature embedded in Update Instructions or source) or other unique identifier of the source included in the packet. Such security checks may be performed by the instruction unpacker circuitry 804 based on the content of the hardAPI packet. Authentication related information may be encoded into the hardAPI frame by the instruction packetizer 710 (FIG. 7) at the time the hardAPI packet was generated. An authentication signature can be included by the API Translator circuitry 722 running at the CPP 701, where the signature can be provided by a DRS manufacturer, and the UIM circuitry 800 can confirm authenticity of the signature as a protection of the sanctity of the routing table against hacking and other forms of cyber-attacks. After unpacking the payload and successfully confirming authenticity, the instruction unpacker circuitry 804 can send the update instructions to the update instruction buffer 806.

The update instruction buffer 806, included within the hardAPI packet processing circuitry 810, may receive and store the unpacked route instructions. The route instructions may be stored in the queue of the update instruction buffer 806 until extracted by the instruction translator circuitry 808. If the update instruction buffer 806 gets to be full according to a predetermined threshold, a suitable flow control signal may be asserted to the update instruction packet receiver 802 over a flow control line 842. In response to receipt of the flow control signal, the update instruction packet receiver 802 can transmit a flow control message 850 back to the USM over the connectivity system, to temporarily halt the flow of hardAPI packets to the UIM. The flow control message may be transmitted over the connectivity system to the upstream module/device, such as the USM circuitry, based on the source MAC address and/or IP address received in the hardAPI packet.

The instruction translator circuitry 808, which is also included in the hardAPI packet processing circuitry 810, can perform a number of different types of memory write related preprocessing and security related processing, of contents of the hardAPI packets stored in the update instruction buffer 806. In an example, the instruction translator circuitry 808 can perform a base address translation, which can include offsetting and masking. The related offsets and masking information can come from the configuration registers circuitry 818. The route update instructions provided from USM circuitry can generally be at different absolute addresses than the address location where the actual table routing resides in the routing table memory 828 of the UIM circuitry 800. This may be due to any of various reasons such as due to better address management at the DRS 800, multiple different DRS circuitry supporting the route being updated, and/or security of the routing table's data structure.

In another example, the instruction translator circuitry 808 can perform translation related formatting after successful authentication of a signature. Formatting by the instruction translator circuitry 808 can involve conversion, such as Endian (Big Endian and/or Little Endian) conversion. In this example, the instruction translator circuitry 808 can receive, within the hardAPI data packet, parameters indicative of Endian conversion such as, for the case of Big Endian, the size of each word included in the hardAPI packet, and for Little Endian, the number of bytes included in the hardAPI packet. In an example, the instruction translator circuitry 808 can receive data and operating instructions in Little Endian, and routing update instructions in Big Endian with corresponding parameters included in, for example, the route update attributes (Table 2) included in the hardAPI data packets.

In yet another example the instruction translator circuitry 808 can provide decryption related security protection of the route table entry. In addition (or alternatively) to the address authentication, such as MAC and/or IP address authentication, provided by the update instruction packet receiver 802, and the signature authentication provided by the instruction unpacker circuitry 804, the data coming to the routing table can be encrypted. Since the instruction translator circuitry 808 knows the USM and corresponding API translator circuitry 722 (FIG. 7), the presence of encryption can be identified, and decryption may be performed based on keys, hash or some other decryption technique using the instruction translator circuitry 808. In some examples, encryption related information, such as public and private locally stored keys can be maintained between the API Translator circuitry 722 running at CPP and the UIM circuitry running at the DRS 801.

In addition, the instruction translator circuitry 808 can perform de-compression related data processing. Decompression can include the capability of the instruction translator circuitry 808 to translate a single route update instruction into multiple memory location updates in the routing table stored in the routing table memory 828.

In the case of a single update instruction being used to update multiple memory locations in the routing table memory 828, translation by the instruction translator circuitry 808 may include state machines or micro-coded engines, without the use of a CPU or other processor to avoid and/or minimize undesirable cycle time during the route update instruction processing by maintaining the processing in hardware.

Figure 9:
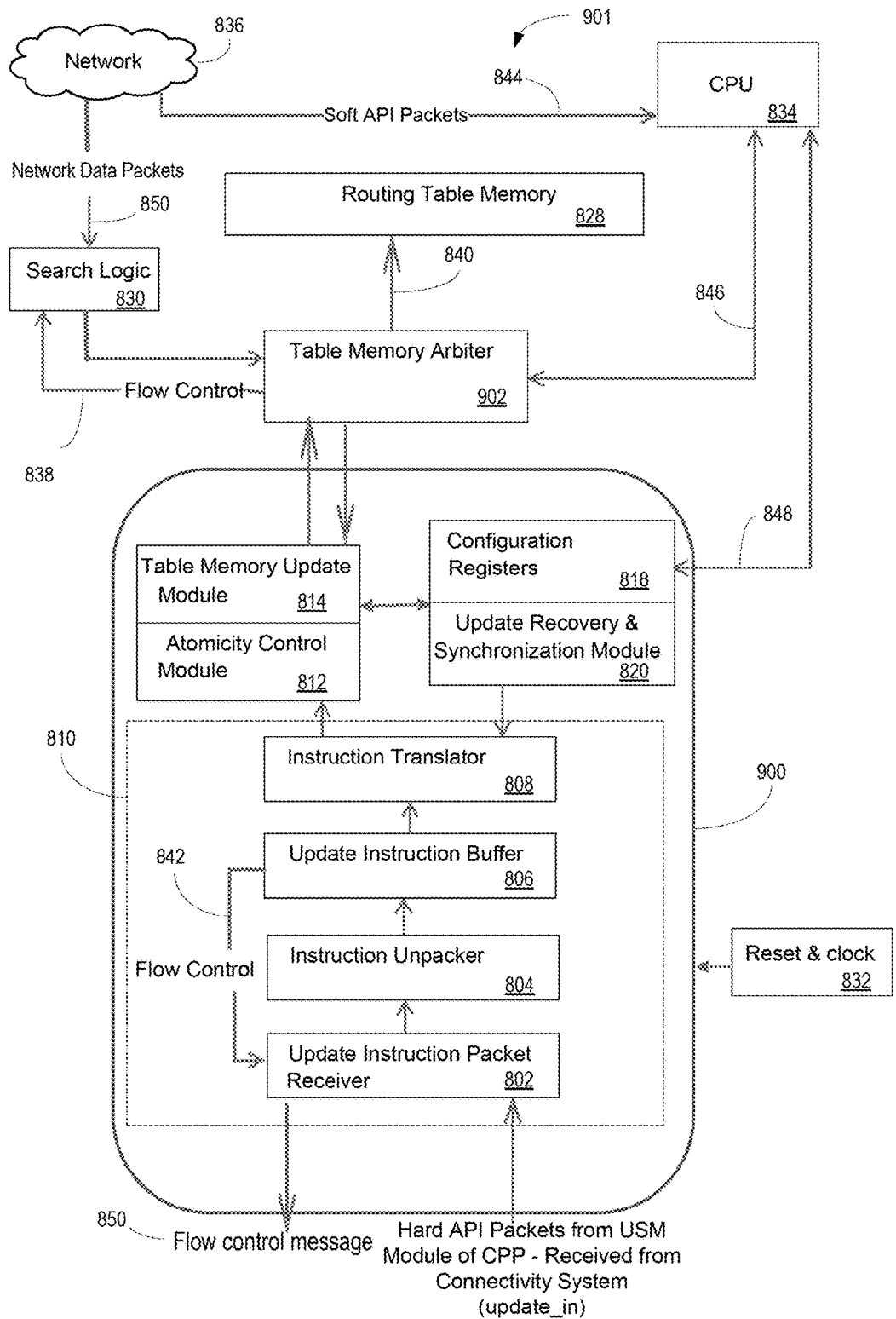
FIG. 9 is another example of an update inject module (UIM) 900, which may be implemented in hardware as circuitry.

FIG. 9 is another example of an update inject module (UIM) 900, which may be implemented in hardware as circuitry. The UIM circuitry 900 may be implemented in a DRS 901 that is similar in many respects to the UIM circuitry 800 discussed with reference to FIG. 8. Thus, for reasons of brevity, the discussion will focus on differences with the UIM circuitry 800 and DRS 810 of FIG. 8.

In FIG. 9, table memory arbiter circuitry 902 is included in the DRS 901 external to the UIM 900. In this example configuration, the CPU 834, the UIM circuitry 900 and the search logic circuitry 830 may be one of any number of different entities accessing the routing table memory 828. Thus, the table memory arbiter circuitry 902 or the DRS 901 may include an existing bus or other communication path with which the table memory update module circuitry 814 may interface to provide requests and update instructions. In addition, the table memory arbiter circuitry 902 can allocate access to the routing table memory 828 and initiate flow control with a flow control signal over the flow control line 838, as previously discussed.

Figure 10:
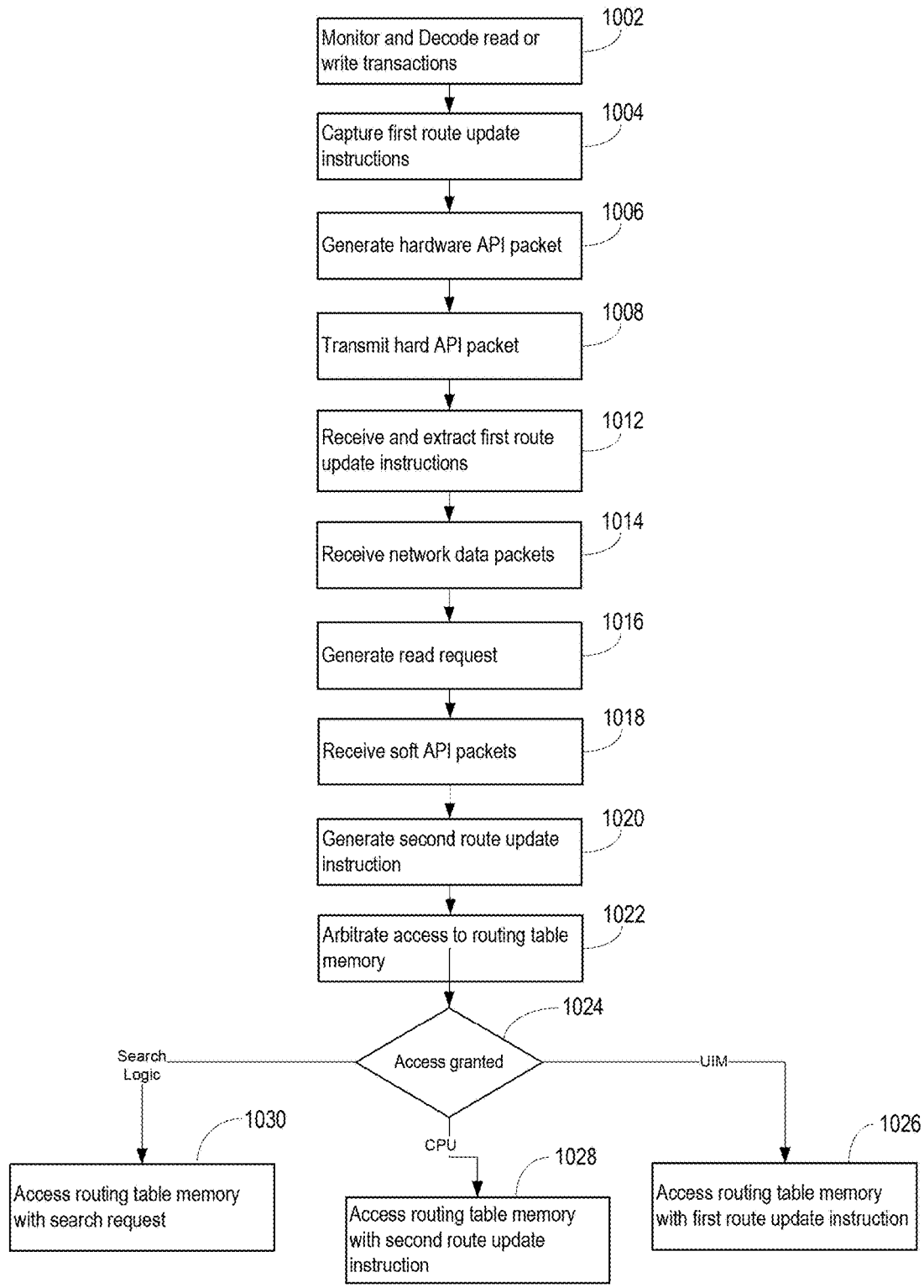
FIG. 10 is an operational flow diagram illustrating an example operation of the route update system.

FIG. 10 is an operational block diagram of example operation of the RUS. The USM circuitry may monitor and decode read or write transactions provided on a memory interface bus of a CPP. (1002) Update routing instructions may be identified and captured by the USM circuitry. (1004) A hardAPI packet having a single data layer and a header that includes IP addresses and/or MAC addresses as the source and destination can be generated to include update routing instructions as a payload that are directly useable by a hard engine. (1006) The hardAPI packet may be transmitted over a connectivity system to UIM circuitry included in a DRS identified by the destination MAC and/or IP address. (1008) The hardAPI packet can be received at the UIM circuitry and unpacked to extract the route update instructions. (1012) The DRS that includes the UIM circuitry may also receive network data packets with search logic circuitry included in the DRS. (1014) The search logic circuitry can generate read requests based on processing of the network data packets. (1016) The DRS that includes the UIM circuitry may also receive softAPI packets with the CPU included in the DRS. (1018) The CPU can process the softAPI packets to generate a second memory write instruction. (1020) A table memory arbiter can arbitrate exclusive access to a routing table memory between the search logic circuitry, the CPU and the UIM circuitry. (1022) The table memory arbiter may enable access and updates to the routing table memory by either the CPU (1028) or the UIM circuitry (1026), and enable access and reads by the search logic circuitry (1030).

Existing CPP Example Enhancements

CPP enhancement may include adding a USM to an existing core-to-memory communication bus of a CPP device. A core may include an existing cache (L1 or L1/L2 or L1/L2/L3), the bus or communication link of interest for adding the USM can be between the last (e.g., highest) cache to the external memory (e.g., external to the core). The enhancement of adding the USM may vary depending on a particular implementation of the CPP.

Existing DRS Example Enhancement

The DRS enhancement may include adding a UIM (or both a USM and a UIM) to a "search logic"-to-memory communication bus of a DRS device. Since the UIM may inject route update instructions (as opposed to just snoop), the UIM may be positioned serially in the communication path of the search logic to the routing table memory. Thus, to install the UIM, the path can be "broken" and the UIM table arbiter circuitry can be inserted in order to operate as an arbiter between the search logic and the table memory update module of the UIM, as previously discussed. Optionally, the DRS may implement or add the UIM such that the UIM is inserted at a point where the UIM is able to flow control an upstream data flow coming from search (or non-RUS processor input/output) logic. The enhancement of adding the UIM may vary depending on a particular implementation of the DRS.

Multiple Master Configurations

A RUS may include multiple master devices or logic, as previously discussed. In such a scenario, one or more of the following exemplary specification may optionally be implemented in the RUS:

As a first exemplary specification, the RUS may specify that a particular address space is owned by single master. For example, L2 (MAC) entries may be owned by a DRS (with master functionality) and L3 entries may be owned by a CPU or CPP.

As a second exemplary specification, the RUS may specify that ownership of a shared address space is separated in or according to a predetermined time dimension or operational window. This may be implemented by time based sharing or operational based sharing. Thus, a CPU or CPP may "own" a shared address space in memory or cache or the configuration registers at the time of initialization of the RUS system, and the DRS may own the shared address space at run time of the RUS. For example, a shared address space of cache L2 entries may be shared between a CPP and DRS in this way. Optionally or in addition, the RUS may specify a handshake of ownership transfer between masters.

As a third exemplary specification, the RUS may specify that a shared ownership table is tolerant of mis-ordering of updates. The RUS may also specify that hardware that "owns" (such as directly, and therefore has priority) the shared ownership table can arbitrate among the other co-owners in order to ensure multiple updates do not garble or corrupt the content. An example application of a shared ownership table may be in the case of aging entries and/or hit bit entries.

Additional Example Specifications for Control Plane Processor (CPP)

The RUS may specify one or more of the following exemplary specifications for CPP devices operating in connection with the RUS.

As a first exemplary CPP specification, the CPP may read the lowest bits first and then higher bits while reading the LastUpdate register (Table 3). This specification may apply when the whole register cannot be read in one go, such as, when requiring multiple read operations to read the LastUpdate register.

As a second exemplary CPP specification, the CPP may enforce parameters to ensure read-update coherency. Since the RUS may be defined and used for table route update purposes, read-update coherency should be handled uniformly within the RUS. In some cases, there is no read involved, so maintaining read-update coherency may be inapplicable. In some cases where a read may be called for, the RUS may enforce or provide specifications for a master to follow to ensure that such coherency is maintained across different platforms, devices and circuitry. For example, the RUS may specify that a master (e.g., CPP or DRS) use only a single consistent method of update for a given address space. In an operational example, the RUS may use a predetermined RUS specific method, or a conventional method, but not both, for a given address space. If, for example, the update method is a predetermined RUS specific method, the master device may read the routing tables to get "a copy" of the routing table of interest, and use the "UpdatesSinceLastRead" parameter (Table 3) to determine if (and how many) updates took place to a given address space since the last read. The master device may also access the MaxUpdateAddrSinceLastRead" parameter and the "MinUpdateAddressSinceLastRead" parameter (Table 3) as part of the determination. Also, the master device (such as a CPP) may use the LastUpdate register (and UpdateList storage) of Table 3 to read an address as well as data and the time of a last update. Optionally, as an extra check, the master device may determine if the update occurred through the RUS or not and use the "time" parameter or other corresponding data to do precise synchronization using the update recovery and synchronization module.

Additional Example Specifications for Data Route Switch (DRS)

An RUS compatible DRS device may meet one or more of the following exemplary specification.

As a first exemplary specification, the DRS may allow push back (delay) of a search for up to MaxSrchPushBack clocks either after occurrence of "IDLE" on search or after MaxUpdateHold clocks of continuous search instructions are encountered (while update is pending). Alternatively or additionally, the DRS may allow another equivalent mechanism that ensures the UIM update instruction buffer does not overflow.

As a second exemplary specification, the DRS may implement the RUS update_in port, bus, or interface as part of the processor input/output circuitry 834. The DRS may implement the update_in port as physical interface (e.g., a dedicated IL/ILA or PCIe or Infiniband or Ethernet port). Alternatively or additionally, the DRS may implement the update_in part as a logical port (borrowed from or physically implemented via another hardware communication port) that can provide the required performance without dynamic involvement of software.

As a third exemplary specification, if the DRS is a master to a routing table, the DRS may implement a method or functionality to disable the local update of the routing table. This specification is to allow for a deterministic golden image of the routing table (master copy of the routing table) at a CPP, if required.

As a fourth exemplary specification, if the DRS also works as a master, the DRS may implement a snoop_out port, bus, or interface. If the DRS does not implement the snoop_out port, or some equivalent communication path, the responsibility of coherency of a CPP's image of a particular table and the DRS's image of the particular table may be performed by the CPP.

As a fifth exemplary specification, the DRS may maintain one or more "LastUpdate" registers. For example, the DRS may implement one such register on a per Address Space basis. Each register may have Update Attribute Bits (see LastUpdate register—Table 3). If the read data width does not fully cover these registers, the DRS may maintain a shadow copy of the upper bits of the LastUpdate registers. The DRS may fill the shadow register with an upper portion of the main (e.g., non-shadow) register when the lowest bits of the register are read. All the higher bits may be returned from shadow copy.

As a sixth exemplary specification, the DRS may maintain one or more "UpdatesSinceLastRead" registers (Table 3). For example, the DRS may implement one such register on a per Address Space basis.

As a seventh exemplary specification, the DRS may maintain a number of updated addresses according to the UpdateListDepth parameter value (Table 1), and the DRS may implement one such set of registers for each update address space. The DRS may implement two copies, current and shadow. In some implementations, the updates that happen after the lowest bits of LastUpdate register (Table 3) is read go to the current copy and the update that happened before (or at the clock) go to shadow copy (from where the actual data is read).

RUS Connectivity System (RCS) Example Specifications

A RUS may be implemented such that some or all of the RUS-related functionality is handled by the USM(s) and the UIM(s) in the RUS, which may allow for flexibility in intermediate connectivity systems linking the USMs and the UIMs. Various intermediate connectivity system may be used. Some optional guidelines that the RCS may meet are presented next:

As a first exemplary guideline, the performance of the RCS may match with the peak and average update traffic. For example, the performance of the RCS may meet or exceed the equivalent of the RUS Clock period (RCP) parameter (Table 1).

As a second exemplary guideline, the hardAPI packetization (manifested as packet size or burst length) supported by the RCS may be consistent with Update Group Size (UGS) requirements.

Update Performance

The disclosure herein, including the RUS, may increase routing table update performance. This section analyses the gain in the update performance. One possible maximum (guaranteed) performance is determined by the following parameters:

At the CPP end, the performance may be determined from parameters included in the RUS at least some of which are described in Table 1, such as: (CPPFrequency*CPPUpdateWordSize*CPPMaxUpdateCountLimit)/(CPPMaxUpdateCountLimit+CPPMinUpdateBreak)

For the RUS connectivity system, the update rate (without conflict) may be tied to the RUS frequency. For example, at a RUS Clock Period of 4 nanoseconds (ns), the RUS frequency can be about 250M updates/sec (each update in unit of RUS Word size that may be 64 bits).

At the DRS end, the update rate may be determined from parameters of the RUS system such as those discussed with reference to Table 1, such as: (DRSFrequency*DRSUpdateWordSize*(MaxSrchPushBack/(MaxSrchPushBack+MaxUpdateWait)).

Of the above equations and performance metrics, the RUS may measure performance as a metric that provides a minimum value, which may be the metric for the DRS. As one illustration, assume the following example values:

DRSFrequency=500 MHz
DRSUpdateWordSize=1 (same as RUS Word Size)
MaxSrchPushBack=MaxUpdateWait For these assumptions, the value of update rate can be, for example, about 250M updates/sec. For comparison, the typical control plane update rate for a non-RUS system may range from 1K to 100K/sec. In other words, the RUS may increase update performance by many orders of magnitude. When it comes to such update rates, the extent to which a main path (search for example) can be pushed may more greatly affect performance than the capability of an update path (that includes CPP software) itself. Also, various designs may not allow access to the memory bus of the memory routing table, and the RUS may have to use intermediate bus controllers, which may control the effective throughput.

Update Speed Matching

The CPP may perform a string of routing table updates at very high frequency. The RUS may make these updates in the Table Holder device (such as a DRS), which is transparent to the CPP. The USM may implement a buffer to make such transparency possible. The USM may limit the buffering so as not to break (e.g., overflow) if the updates continue indefinitely. The RUS may implement one or both of the follow two methods to handle this situation:

Software method: RUS may include hardware executing software to limit the number of updates to a CPPMaxUpdateCountLimit parameter value. (Table 1) Once the limit is reached, the update software can wait for CPPMinUpdateBreak number of clocks (e.g., the clock that drives the USM) before resuming updates. (Table 1)

Hardware Method: The RUS may assume that the actual update rate will always be lower than what the RUS can handle based on, for example, an upper performance limit. Hardware in the RUS may use a flow control signal from the USM, the "usm_cpu_hold" signal. This flow control signal can be used to freeze the CPU. Accordingly, this method may be software-transparent as software never comes to know about such a situation. For debugging, the RUS may implement two counters that count the number of clocks while such a flow control freeze is applied. One counter can hold a predetermined minimum freeze duration threshold, and other counter can hold a predetermined maximum freeze duration. The RUS may also count or track the number of such freeze incidents.

Data Synchronization in RUS

RUS functionality may also extend to systems requiring or supporting portability of routing tables. The portability of routing tables may be used or implemented for redundancy or failure recovery, for example. The redundancy or failure could apply to one or both the CPP and the DRS ends.

When Master is CPP

In this scenario, the table within the CPP master is already the assumed-correct reference table. The only check needed is to access the LastUpdate register value from a Table Holder DRS to ensure that a last update expected has been performed. This step (of validating through LastUpdate register) may be a safety method and helps when there may be a buffer resident at the RCS that may take some time to flush.

Scenario Where the Master is Table Holder DRS

This scenario is dynamic and may not allow a deterministic point when a CPP's routing table image can be said to be fully correct or mirroring the routing table in the DRS (which can referred to as "golden"), unless the CPP disables the route update mechanism. In many cases, an image can be assumed correct ("golden") until a precise point in time. The RUS may define the precision in terms of a clock that is used in a table update process by the table holder DRS. There may or may not be a better precision than the clock that is used to update the routing table itself. One possible methodology to update and maintain the assumed-correct (e.g., "golden") image for a CPP when the DRS is the master is presented next.

Before reading the table, the CPP or DRS may read the LastUpdate register. (Table 1) This can include the time (in units of the clock of the Table Holder) when the last update took place to the table. For illustrative purposes, this time (in units of a clock of the table holder device) may be referred to as time T1. Also the CPP or DRS may read the UpdatesSinceLastRead register and the UpdateList storage. (Table 1) This will give the count of updates (such as C1), an address zone where update(s) took place (such as Z1), and specific addresses that were updated (such as L1 cache for example).

If C1 is the same or less than the UpdateListDepth parameter (Table 1), then the CPP or DRS may update the locations that are in the L1 cache, for example. Or else, the CPP or DRS may get the full dump of the table in the address zone Z1 (and the count of update may not help in this scenario).

The CPP or DRS may read the LastUpdate register again, at a subsequent time, which may be referred to as time is T2. Also, the CPP or DRS may read the UpdatesSinceLastRead register and UpdateList storage. UpdatesSinceLastRead can include all updates that happened between time T2 and time T1. In an example scenario, the UpdateCount as extracted from UpdatesSinceLastRead is C2, the address zone is Z2 and the update address list is L2.

Now the image that exists at CPP is what the DRS had at time T1 plus some of the C2 updates that happened in between. In other words, C2 entries spanning the address zone Z2, are under uncertainty. As one illustration, if a line card (holding the DRS) was to be replaced (due to potential failure or just for maintenance), an image of the routing table stored in the CPP could be used to create the routing table in the DRS. If for some reason, an exact image of the DRS routing table was desired, the CPP can disable a local update mechanism(s) of the routing table holder device and then perform the above described process. If the C2 is non-zero, the CPP or DRS may read the image in address zone Z2 again, and then repeat the steps until a subsequent count Cn is 0. If the CPP itself (or card component) is to be replaced, the image along with Tn, Cn, Zn, Ln info can be transferred to next the CPP, and that next CPP can continue from there.

The methods, devices, processing, modules, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A sending device residing in a network, comprising: circuitry configured to:
 determine whether a routing table of a receiving device is to be updated, and when the routing table of the receiving device is to be updated:
    generate a routing table update message including generation of local flow control information for routing table update messages, wherein the local flow control information includes a first flow control signal to limit routing updates and a second flow control signal matching an output of an update snoop module (USM) to an available bandwidth of a connectivity system, and
    transmit the routing table update message to the receiving device.

2. The sending device according to claim 1, wherein the routing table update message further includes an indication of whether updating of the routing table of the receiving device is to be performed atomically.

3. The sending device according to claim 1, wherein the routing table update message is directly decodable by hardware circuitry of the receiving device.

4. The sending device according to claim 1, wherein the routing table update message further includes validation information for validating the sending device.

5. The sending device according to claim 4, wherein the validation information includes an identifier of the sending device.

6. The sending device according to claim 1, wherein the circuitry is further configured to determine whether the routing table of the receiving device is to be updated based on receipt of a table update transaction.

7. The sending device according to claim 1, wherein all memory locations related to a new routing entry are updated in a single continuous linear action without interruption by other processes or activities.

8. A method for a sending device that resides in a network, comprising:
    determining, with circuitry of the sending device, whether a routing table of a receiving device is to be updated; and
    when the routing table of the receiving device is to be updated:
        generating, with the circuitry of the sending device, a routing table update message including generation of local flow control information for routing table update messages, wherein the local flow control information includes a first flow control signal to limit routing updates and a second flow control signal matching an output of an update snoop module (USM) to an available bandwidth of a connectivity system, and
        transmitting, with the circuitry of the sending device, the routing table update message to the receiving device.

9. The method according to claim 8, wherein the routing table update message further includes an indication of whether updating of the routing table of the receiving device is to be performed atomically.

10. The method according to claim 8, wherein the routing table update message is directly decodable by hardware circuitry of the receiving device.

11. The method according to claim 8, wherein the routing table update message further includes validation information for validating the sending device.

12. The method according to claim 11, wherein the validation information includes an identifier of the sending device.

13. The method according to claim 8, further comprising determining whether the routing table of the receiving device is to be updated based on receipt of a table update transaction.

14. The method according to claim 8, wherein all memory locations related to a new routing entry are updated in a single continuous linear action without interruption by other processes or activities.

15. A non-transitory computer-readable medium encoded with computer-readable instructions that, when executed by processing circuitry of a sending device that resides in a network, causes the processing circuitry to perform a method comprising:
    determining whether a routing table of a receiving device is to be updated; and
    when the routing table of the receiving device is to be updated:
        generating a routing table update message including generation of local flow control information for routing table update messages, wherein the local flow control information includes a first flow control signal to limit routing updates and a second flow control signal matching an output of an update snoop module (USM) to an available bandwidth of a connectivity system, and
        transmitting the routing table update message to the receiving device.

16. The non-transitory computer-readable medium according to claim 15, wherein the routing table update message further includes an indication of whether updating of the routing table of the receiving device is to be performed atomically.

17. The non-transitory computer-readable medium according to claim 15, wherein the routing table update message is directly decodable by hardware circuitry of the receiving device.

18. The non-transitory computer-readable medium according to claim 15, wherein the routing table update message further includes validation information for validating the sending device.

19. The non-transitory computer-readable medium according to claim 18, wherein the validation information includes an identifier of the sending device.

20. The non-transitory computer-readable medium according to claim 15, further comprising determining whether the routing table of the receiving device is to be updated based on receipt of a table update transaction.

* * * * *